(12) United States Patent
Tomikawa et al.

(10) Patent No.: US 7,583,796 B2
(45) Date of Patent: Sep. 1, 2009

(54) APPARATUS AND METHOD FOR GENERATING A DATA DISTRIBUTION ROUTE

(75) Inventors: Mayumi Tomikawa, Kawasaki (JP); Fumiyuki Iizuka, Kawasaki (JP); Masanobu Yuhara, Kawasaki (JP); Yu Minakuchi, Kawasaki (JP); Shigeki Moride, Kawasaki (JP); Takayuki Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 407 days.

(21) Appl. No.: 09/879,098

(22) Filed: Jun. 13, 2001

(65) Prior Publication Data

US 2002/0064273 A1 May 30, 2002

(30) Foreign Application Priority Data

Nov. 30, 2000 (JP) .............................. 2000-364555

(51) Int. Cl.
*H04M 7/00* (2006.01)
*H04M 15/00* (2006.01)
*G01R 31/08* (2006.01)
*H04L 12/26* (2006.01)
*H04L 12/28* (2006.01)
*G06F 15/173* (2006.01)

(52) U.S. Cl. .......................... 379/221.02; 379/114.02; 370/238; 370/351; 709/238; 709/239

(58) Field of Classification Search ............ 379/221.02, 379/114.02, 221.01; 709/227, 241, 226, 709/239, 231, 238; 370/390, 395.31, 395.43, 370/238, 449, 356, 392, 235, 238.1, 351, 370/389

See application file for complete search history.

(56) References Cited

U.S. PATENT DOCUMENTS

| | | | | |
|---|---|---|---|---|
| 5,317,566 | A * | 5/1994 | Joshi | 370/238 |
| 5,471,467 | A * | 11/1995 | Johann | 370/238 |
| 5,870,564 | A * | 2/1999 | Jensen et al. | 709/241 |
| 6,067,572 | A * | 5/2000 | Jensen et al. | 709/241 |
| 6,226,673 | B1 | 5/2001 | Yoshimoto | |
| 6,256,309 | B1 * | 7/2001 | Daley et al. | 370/395.43 |
| 6,412,006 | B2 * | 6/2002 | Naudus | 709/227 |
| 6,418,139 | B1 * | 7/2002 | Akhtar | 370/356 |
| 6,574,669 | B1 * | 6/2003 | Weaver | 709/239 |
| 6,631,136 | B1 * | 10/2003 | Chowdhury et al. | 370/395.31 |
| 6,714,559 | B1 * | 3/2004 | Meier | 370/449 |

(Continued)

FOREIGN PATENT DOCUMENTS

JP 4-144338 5/1992

(Continued)

OTHER PUBLICATIONS

Information Processing Society of Japan, Sep. 26, 2001 (http://www.ipsj.or.jp) pp. 3-423-3-424.

(Continued)

*Primary Examiner*—Thjuan K Addy
(74) *Attorney, Agent, or Firm*—Staas & Halsey LLP

(57) ABSTRACT

Re-distribution servers are installed at the branch points of a network for distributing streaming data, and route costs between two re-distribution servers are collected. Then, a distribution route tree from a source to a plurality of clients is automatically generated based on the cost information.

18 Claims, 24 Drawing Sheets

U.S. PATENT DOCUMENTS

| | | | | |
|---|---|---|---|---|
| 6,766,373 | B1* | 7/2004 | Beadle et al. | 709/227 |
| 6,778,531 | B1* | 8/2004 | Kodialam et al. | 370/390 |
| 6,832,253 | B1* | 12/2004 | Auerbach | 709/226 |
| 6,859,842 | B1* | 2/2005 | Nakamichi et al. | 709/238 |
| 6,977,931 | B1* | 12/2005 | Hadziomerovic | 370/392 |
| 7,002,917 | B1* | 2/2006 | Saleh | 370/238 |
| 7,039,709 | B1* | 5/2006 | Beadle et al. | 709/227 |
| 7,181,523 | B2* | 2/2007 | Sim | 709/226 |
| 2002/0023165 | A1* | 2/2002 | Lahr | 709/231 |
| 2004/0210671 | A1* | 10/2004 | Beadle et al. | 709/239 |

FOREIGN PATENT DOCUMENTS

| | | |
|---|---|---|
| JP | 10-164132 | 6/1998 |

OTHER PUBLICATIONS

Notice of Rejection Grounds for corresponding Japanese Application No. 2001-327475 mailed Jun. 27, 2006.

Decision of Rejection issued in corresponding Japanese Patent Application No. 2006-302959, mailed on May 15, 2007.

Toshiya ASABA, "Basic Internet Technique, 11$^{th}$ series, message processing to host", Internet Magazine, Impress Corporation, No. 14, pp. 290-295, Mar. 1, 1996.

Yasutaka Nagao et al., "IP-QoS Server ?System", NEC Technical Journal, vol. 53, No. 11, 2000, pp. 28-32, Submitted on Jun. 13, 2001.

Japanese Office Action mailed Feb. 20, 2007 in corresponding Japanese Patent Application No. 2006-302959 w/ English translation.

Masayoshi Kobayashi et al., "A Network Architecture for Efficient Cache Prefetching in Proactive Cache Network", Technical Report of IEICE, Nov. 22, 2000, vol. 100, No. 456, pp. 103-108.

Japanese Patent Office Action, mailed Oct. 10, 2006, and issued in corresponding Japanese Patent Application No. 2001-327475.

* cited by examiner

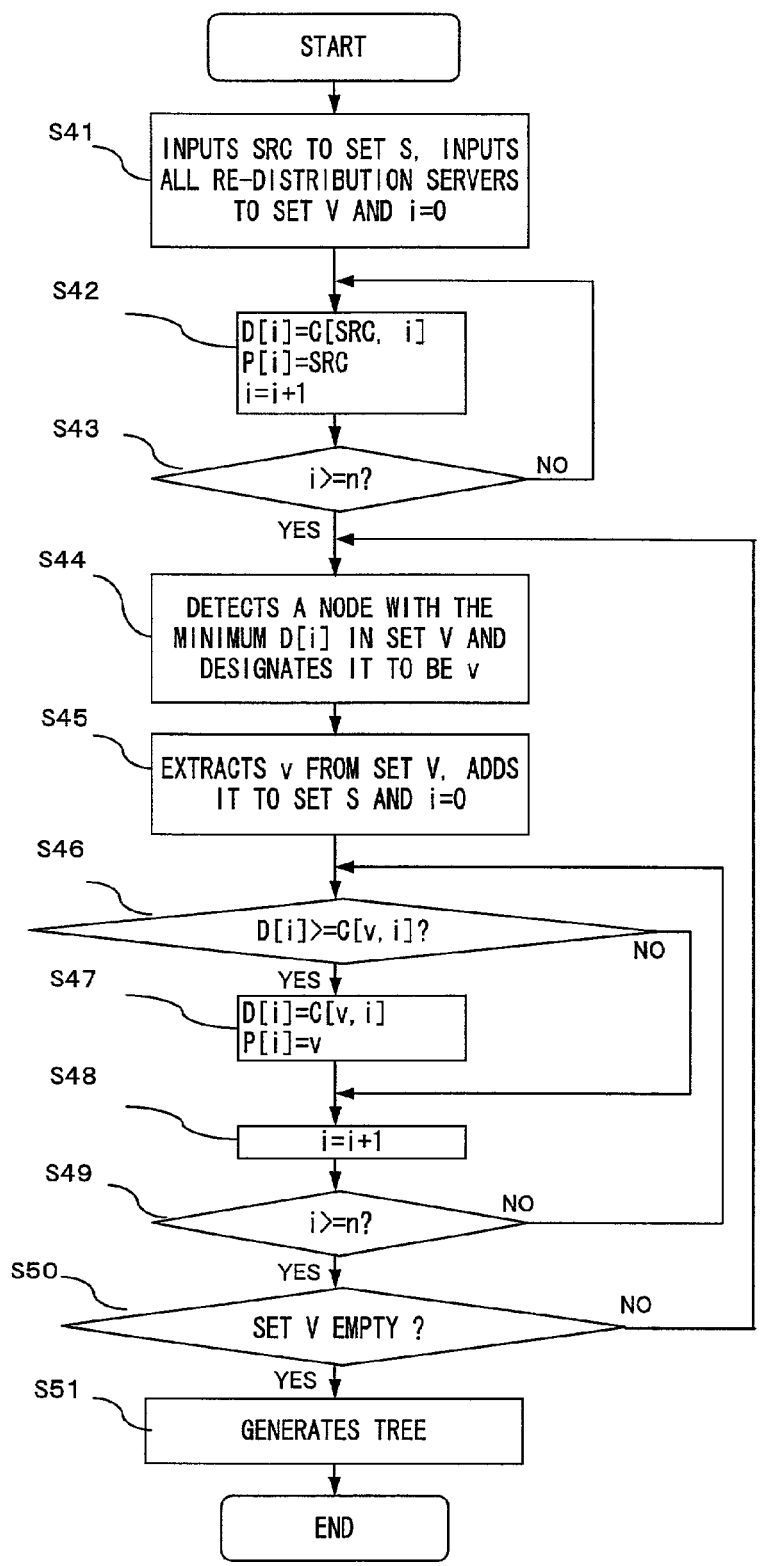
F I G. 7

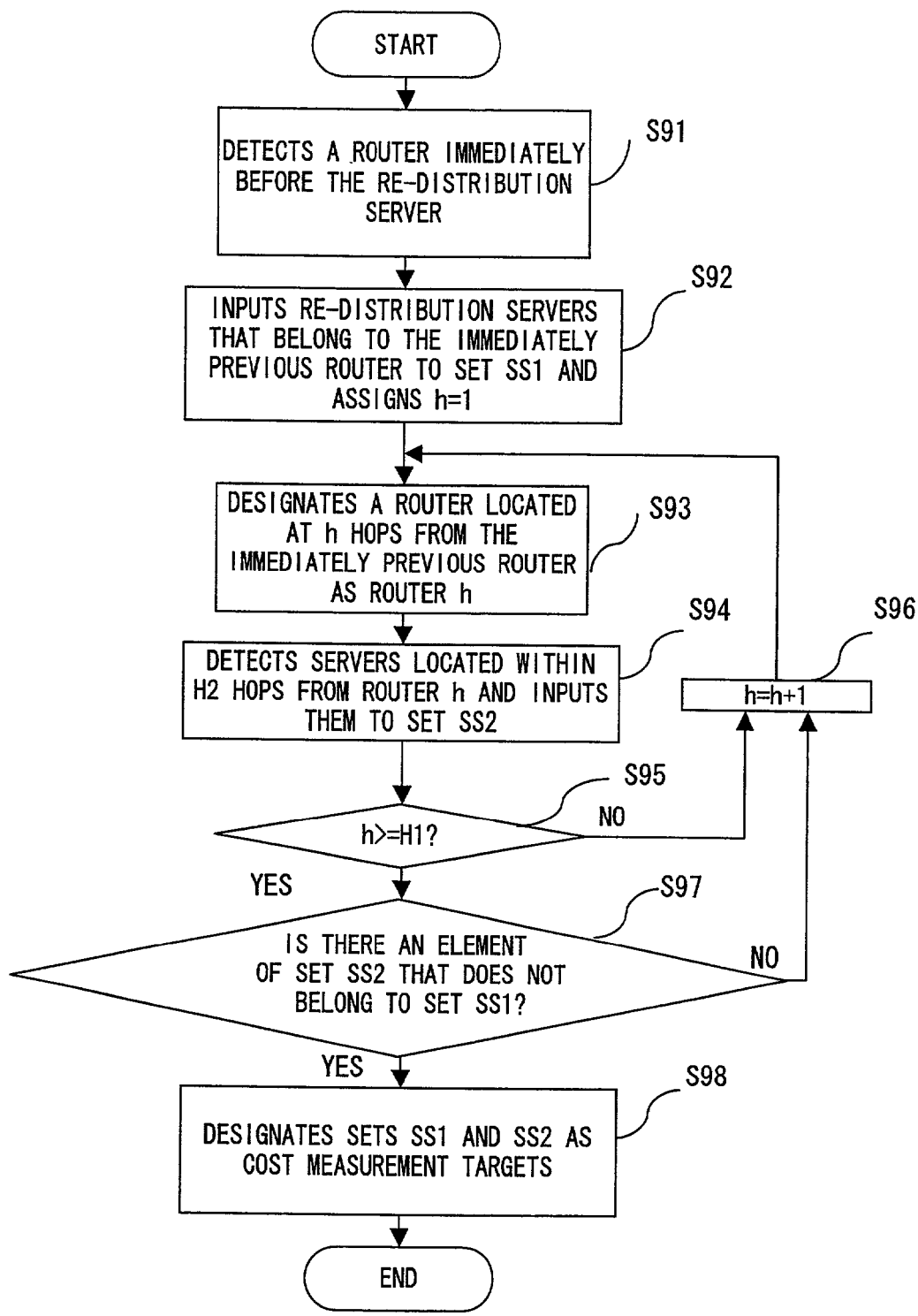
F I G. 1 4

APPARATUS AND METHOD FOR GENERATING A DATA DISTRIBUTION ROUTE

BACKGROUND OF THE INVENTION

1. Field of the Invention

The present invention relates to both an apparatus for automatically generating a data distribution route when a plurality of users on a network receive multimedia data (streaming data), such as the same video, voice, etc., and a method thereof.

2. Description of the Related Art

Figure 1:
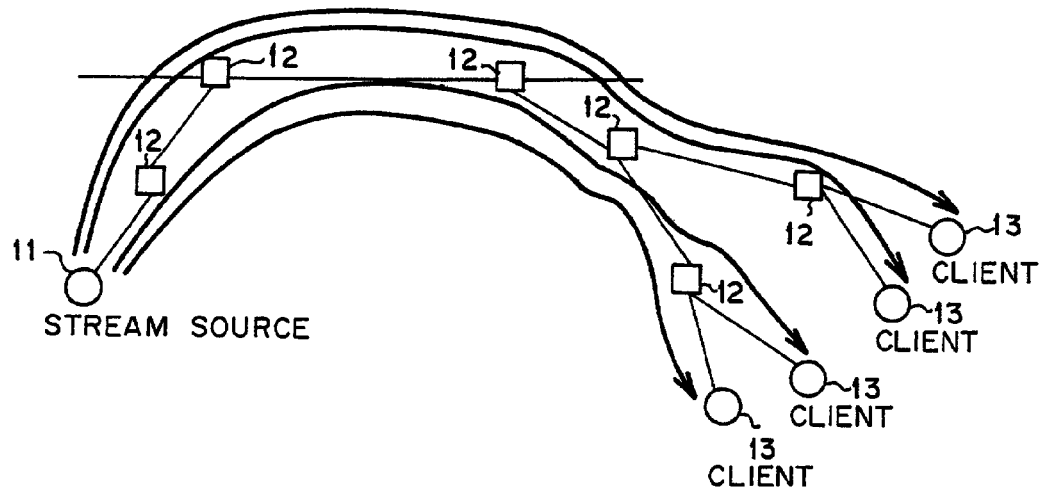

As shown in FIG. 1, if in the current Internet or a current Intranet, a plurality of clients 13 receive the same streaming data, in most cases the source 11 of the data makes the same number of copies of the data as the number of the clients 13 and transmits them (uni-casts). In this case, the data transmitted from the source 11 are transferred to the clients 13 via a router 12.

In this case, since the same data flow through the same network many times, the network gets crowded and sometimes the streaming data is delayed or discarded. For this reason, clients sometimes cannot receive streaming data smoothly.

To solve such a problem and to smoothly distribute data to a plurality of clients, conventionally, the multi-casting of a network layer or the multi-casting of an application layer are used.

As the network layer multi-casting, IP (Internet protocol) multi-casting is popular. In IP multi-casting, if a source transmits data to a multi-casting address assigned to a specific host group, a router on the network automatically generates a distribution tree leading from the source to the clients and branches data as requested. In this way, a plurality of pieces of the same data can be prevented from flowing through the same network.

However, to use IP multi-casting, the network layer of a router on a route from a source to a client must be modified and an IP multi-casting function must be incorporated there. If someone multi-castings streaming data by mistake, data are spread all over the network, unlike uni-cast. Therefore, there is a possibility that other data traffic may be suppressed.

Thus, IP multi-casting has not been introduced in most domains for the reason that there are problems, such as that a network layer must be modified, that the management methods of both a multi-casting address and streaming data are not established, etc.

The multi-casting of an application layer is a method for efficiently distributing data by generating a distribution tree among hosts and an application (re-distribution server) for copying and branching data at the branch point of the tree. Since in this way, data are distributed by an application, there is no need to modify the network of a router (to incorporate an IP multi-casting function). Therefore, in this case, streaming data can be more easily managed than in the case of the multi-casting of a network layer.

However, the conventional application layer multi-casting described above has the following problems.

Since a distribution tree is manually generated, the manager must understand both the configuration and situation of the entire network and must make an appropriate setting of the allocation of re-distribution servers and the like. Even if an application for automatically generating a tree is used, a setting is also required by the manager since it is assumed that the physical configuration of a network, such as the location relationship of routers and the like, is already known.

Usually, it is impossible or difficult for the manager of the basic part of an Intranet to make the network setting of the terminal of the Intranet. If the network manager and the application manager are different (belong to different departments), it is very difficult to make a multi-casting setting.

SUMMARY OF THE INVENTION

It is an object of the present invention to provide both an apparatus for efficiently and automatically generating the distribution route of streaming data in an application layer without requiring troublesome settings to be made by the network manager and a method thereof.

The distribution route generation apparatus of the present invention comprises a collection device, a generation device and an output device. The collection device collects information about communications costs between the nodes of a communications network. The generation device automatically generates distribution route information indicating a distribution route from a source to a plurality of clients based on information about the communications costs when streaming data are originated from the source and are distributed to the clients. The output device outputs the generated distribution route information.

BRIEF DESCRIPTIONS OF THE DRAWINGS

Figure 2A:
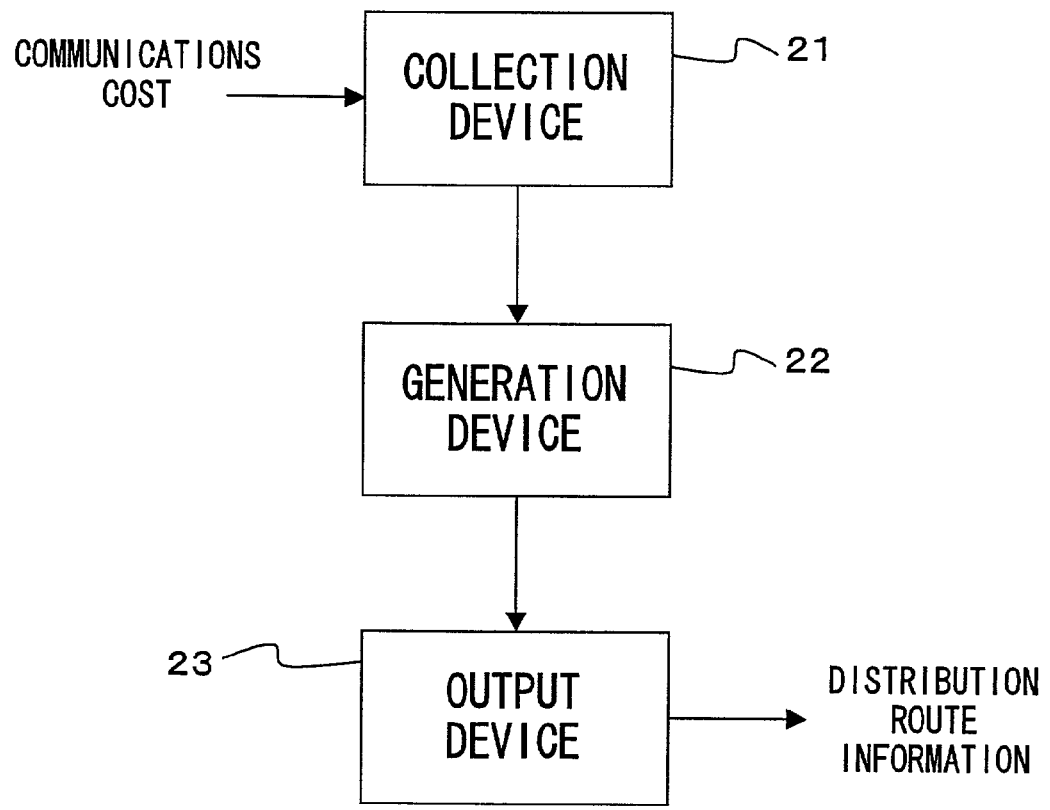
Figure 2B:
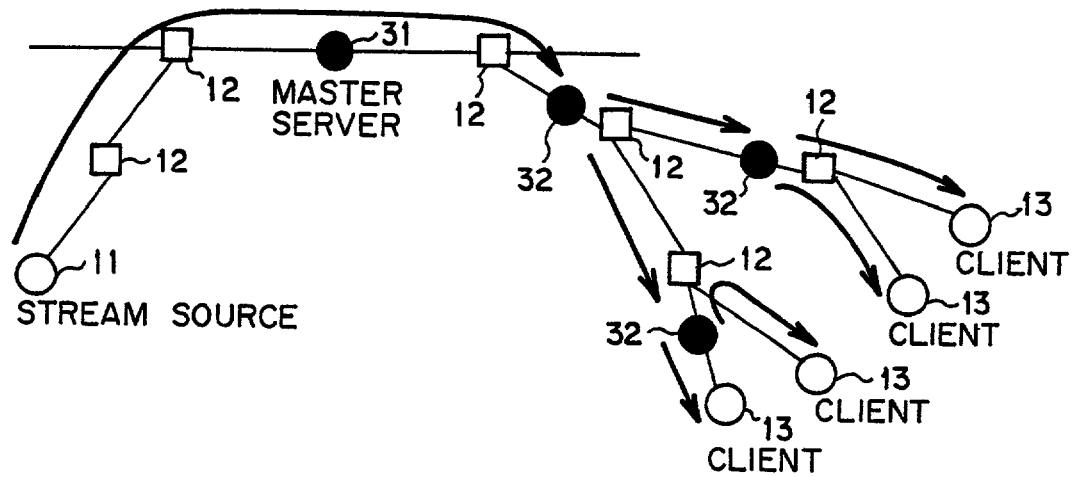
Figure 3:
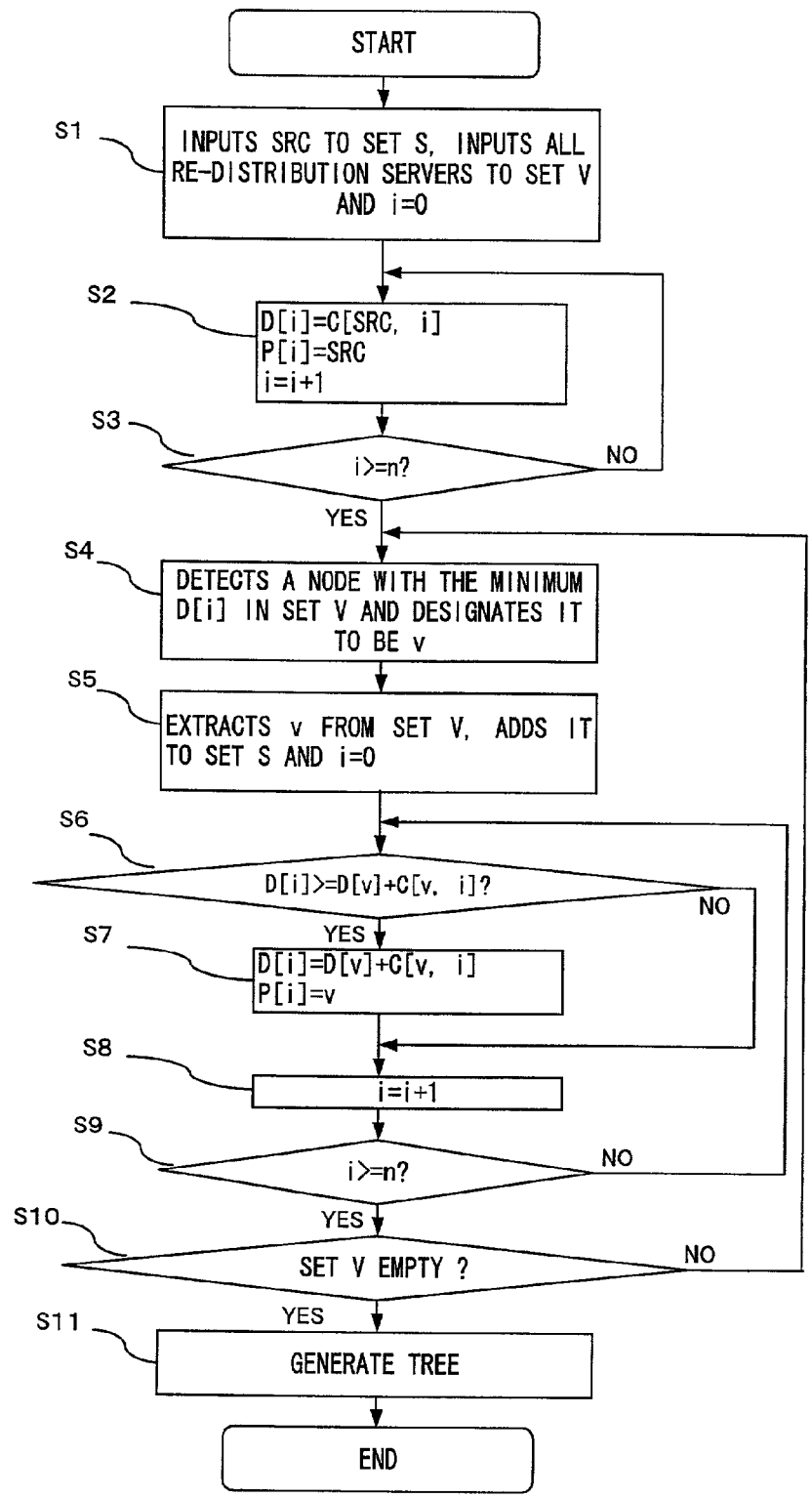
Figure 4:
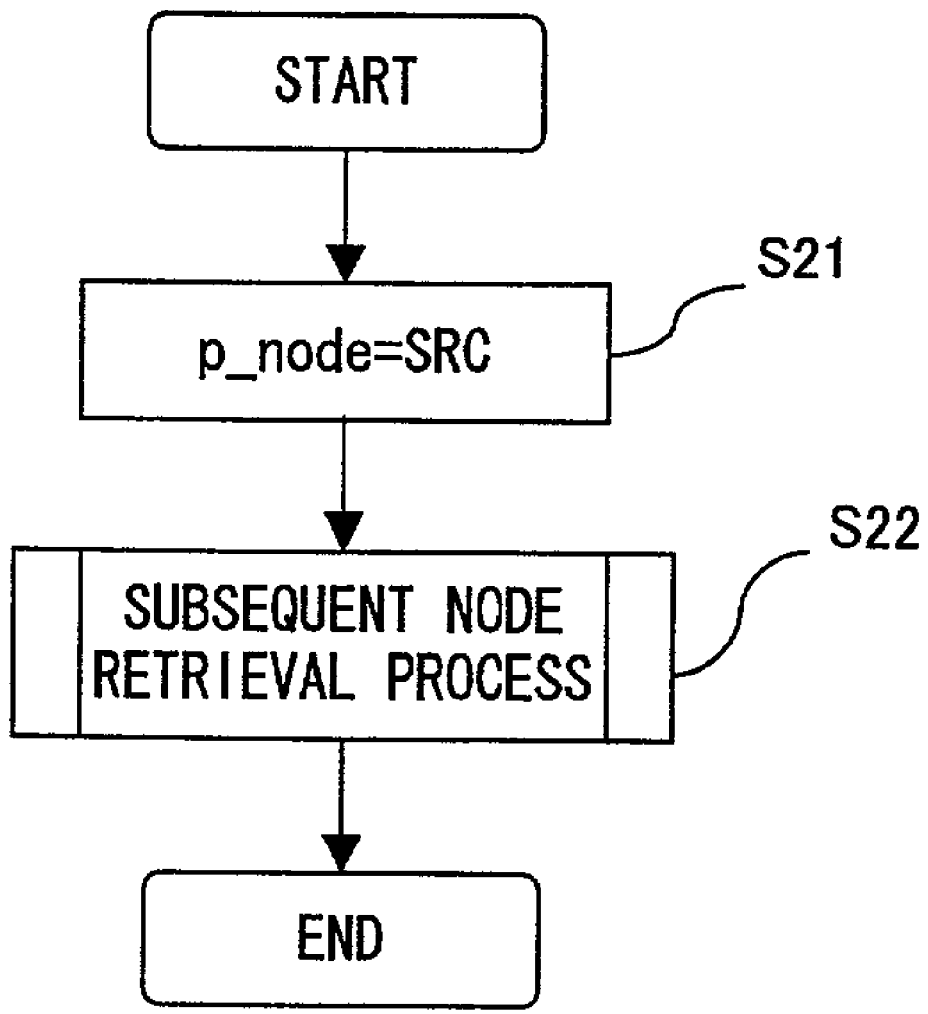
Figure 5:
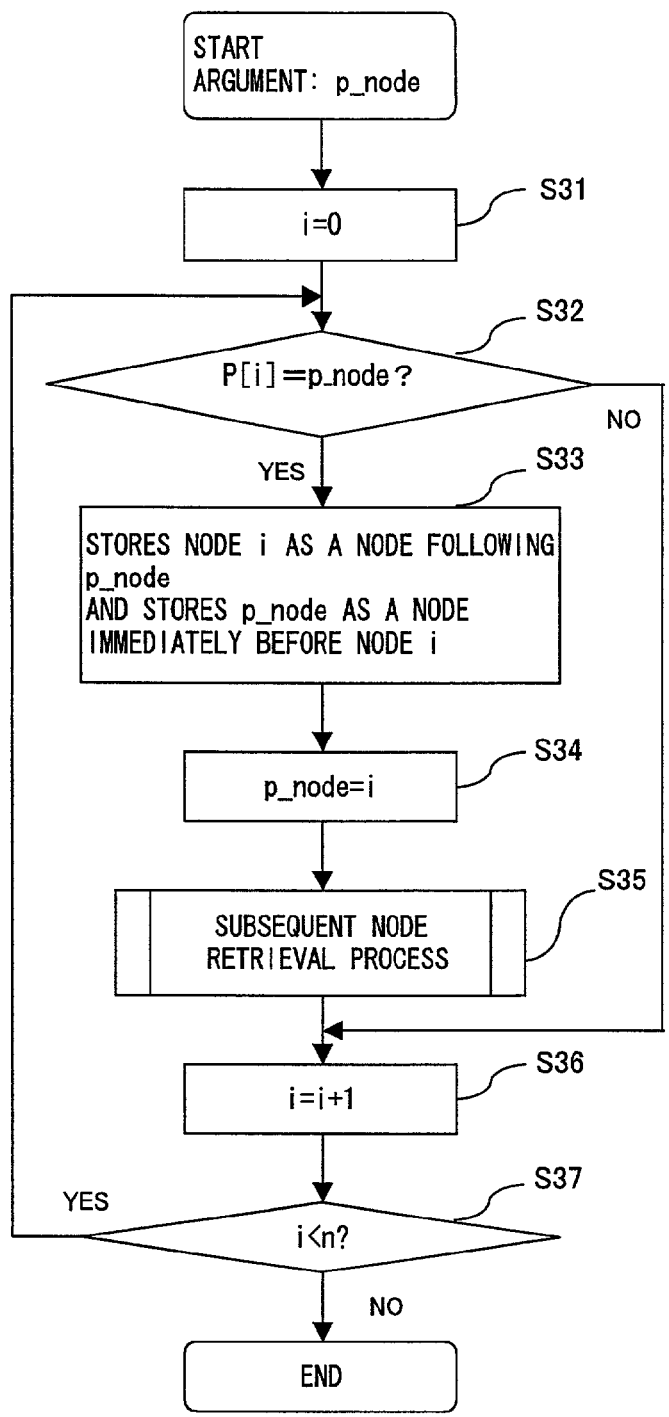
Figure 6:
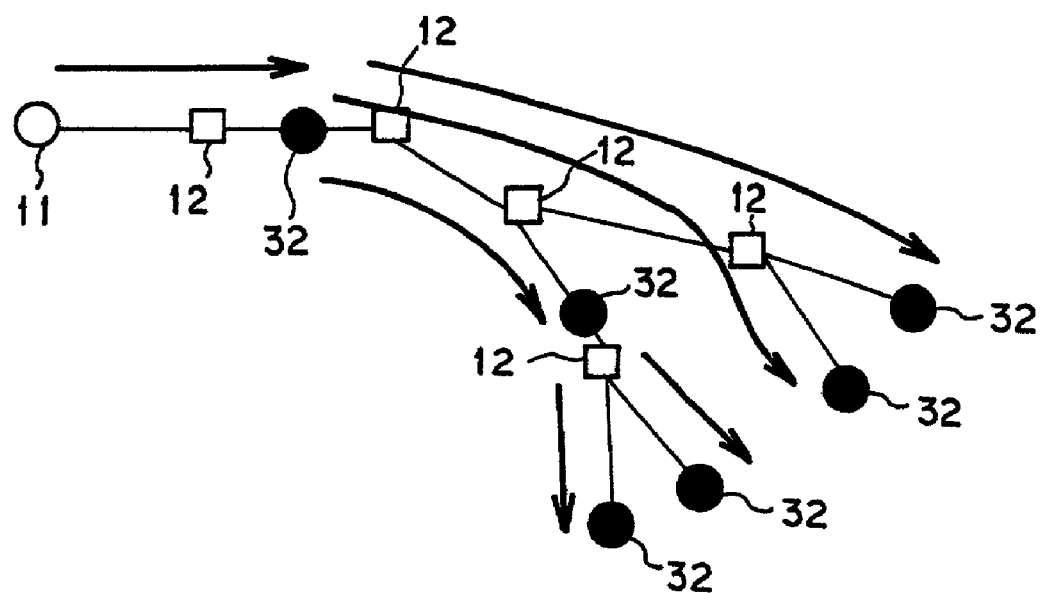
Figure 8:
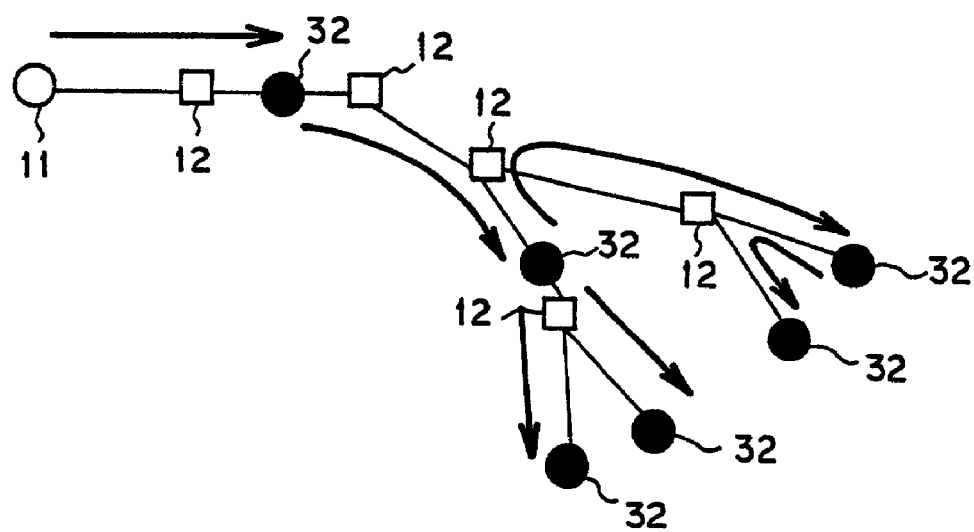
Figure 9:
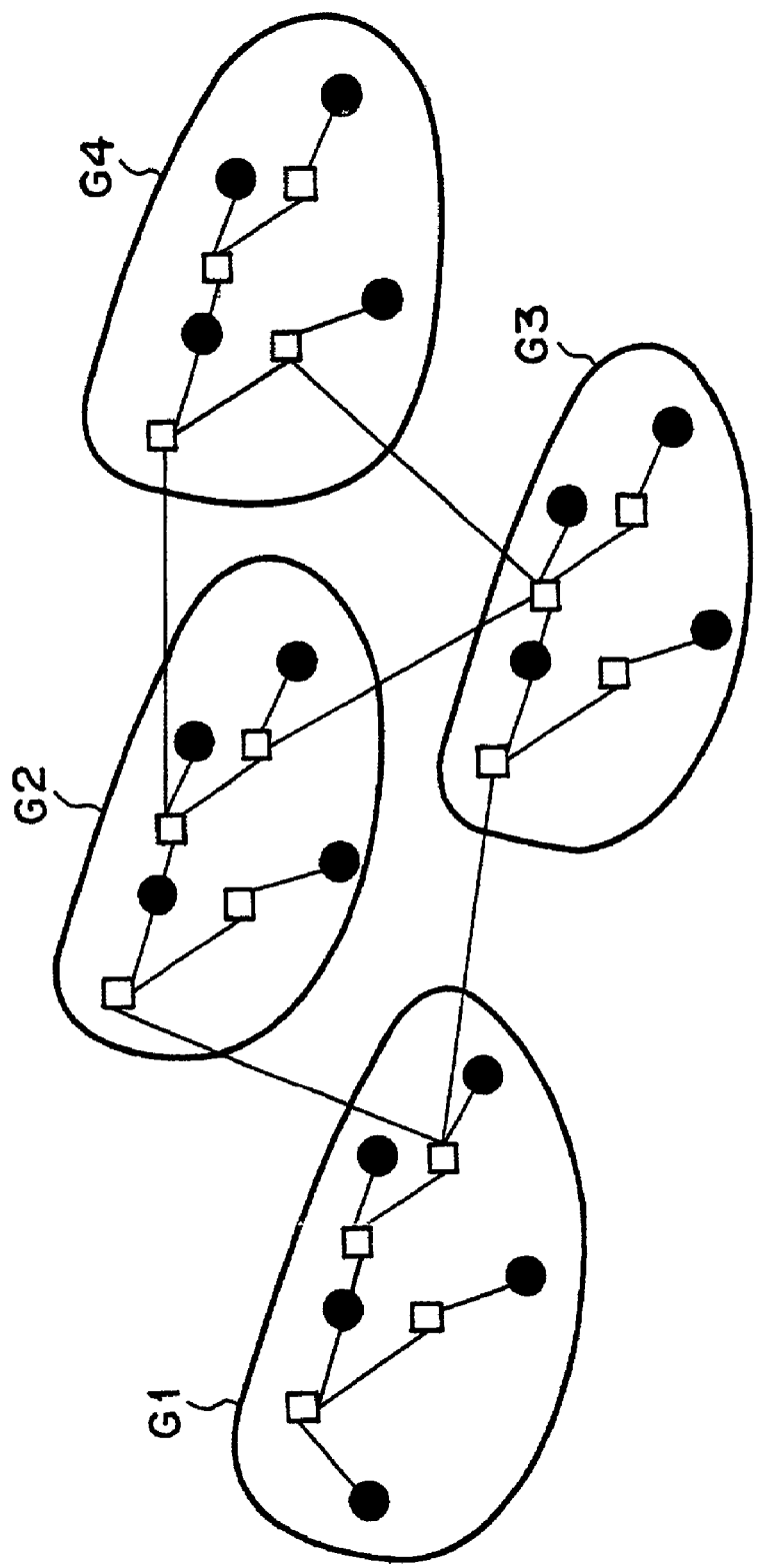
Figure 10:
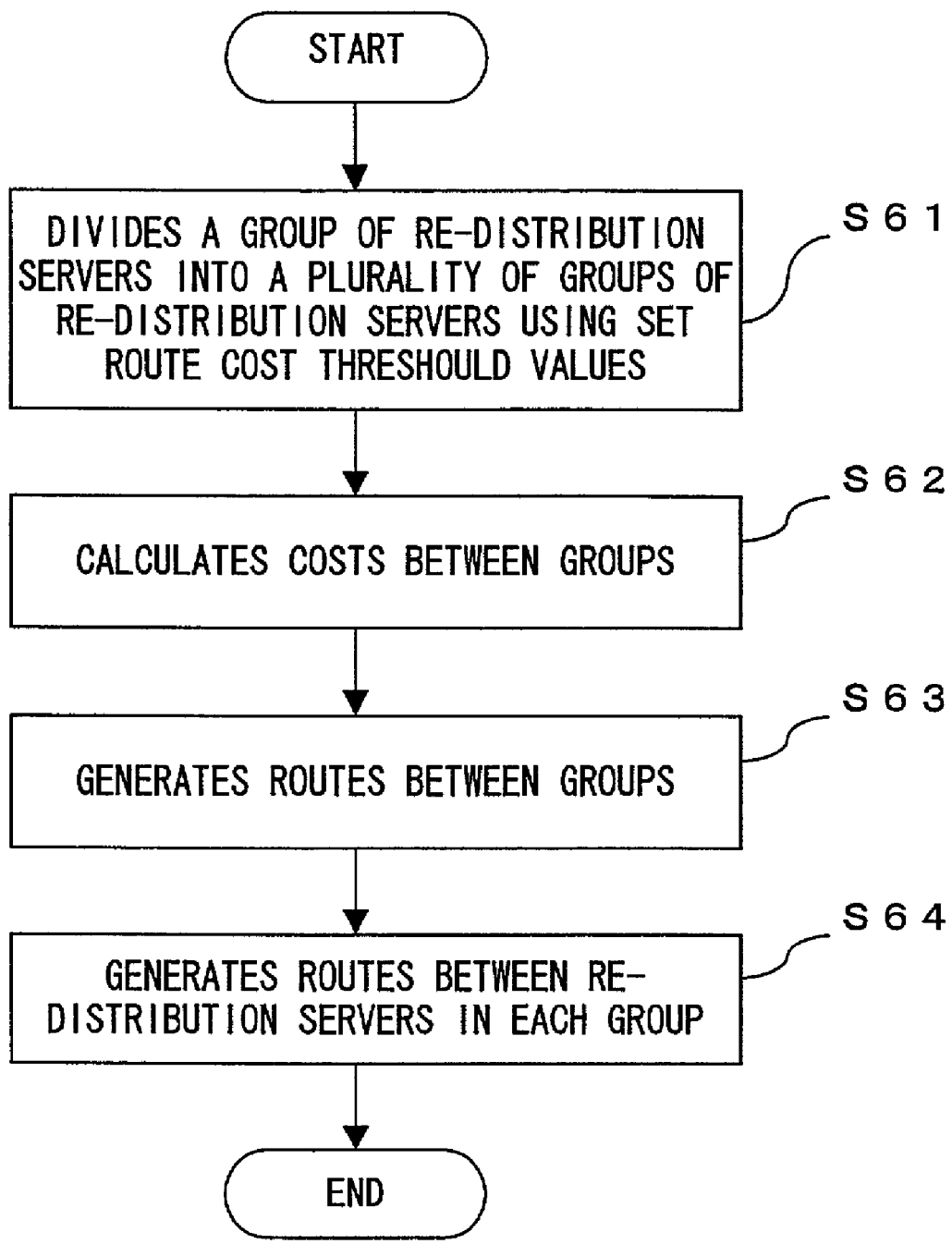
Figure 11:
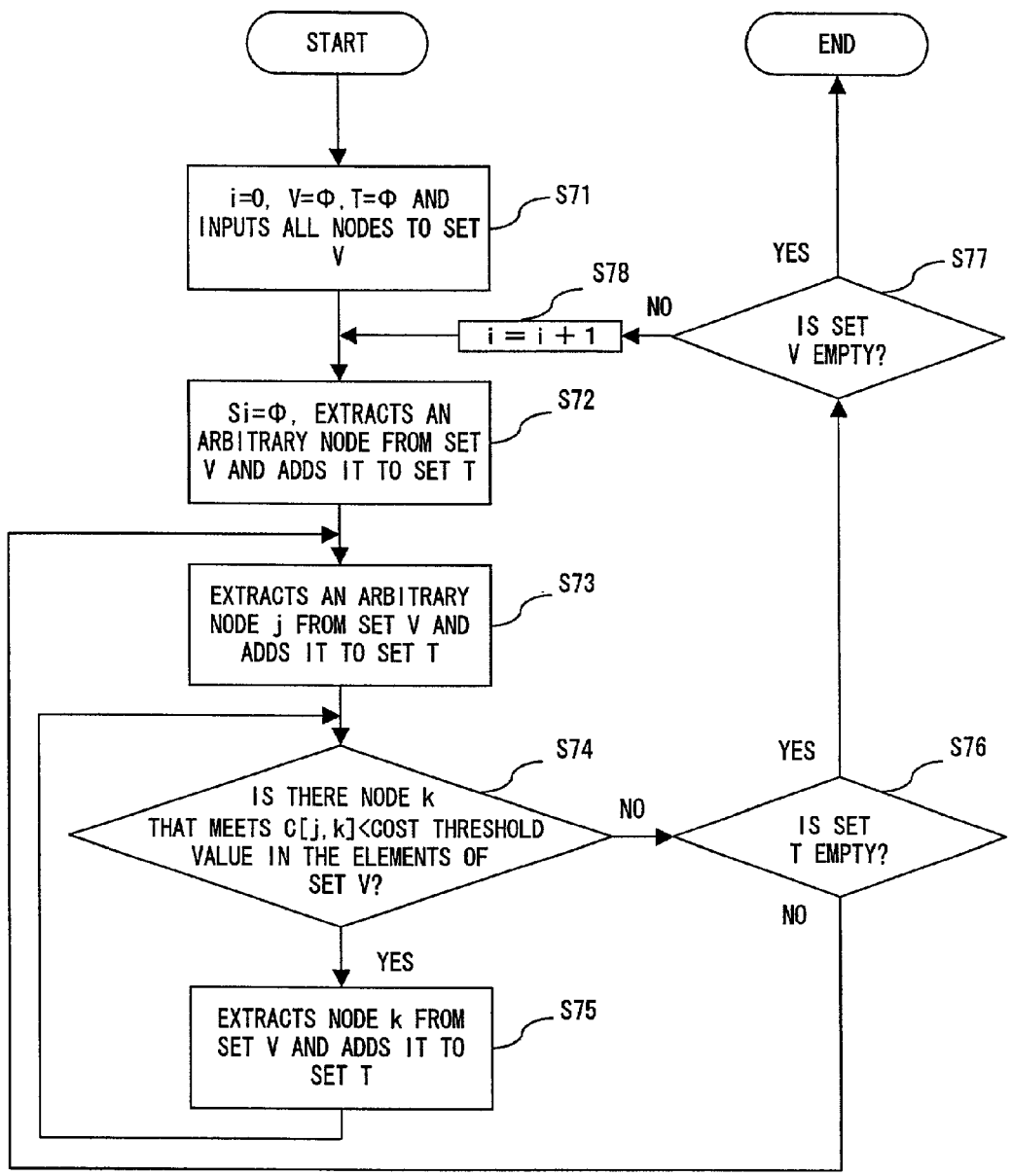
Figure 12:
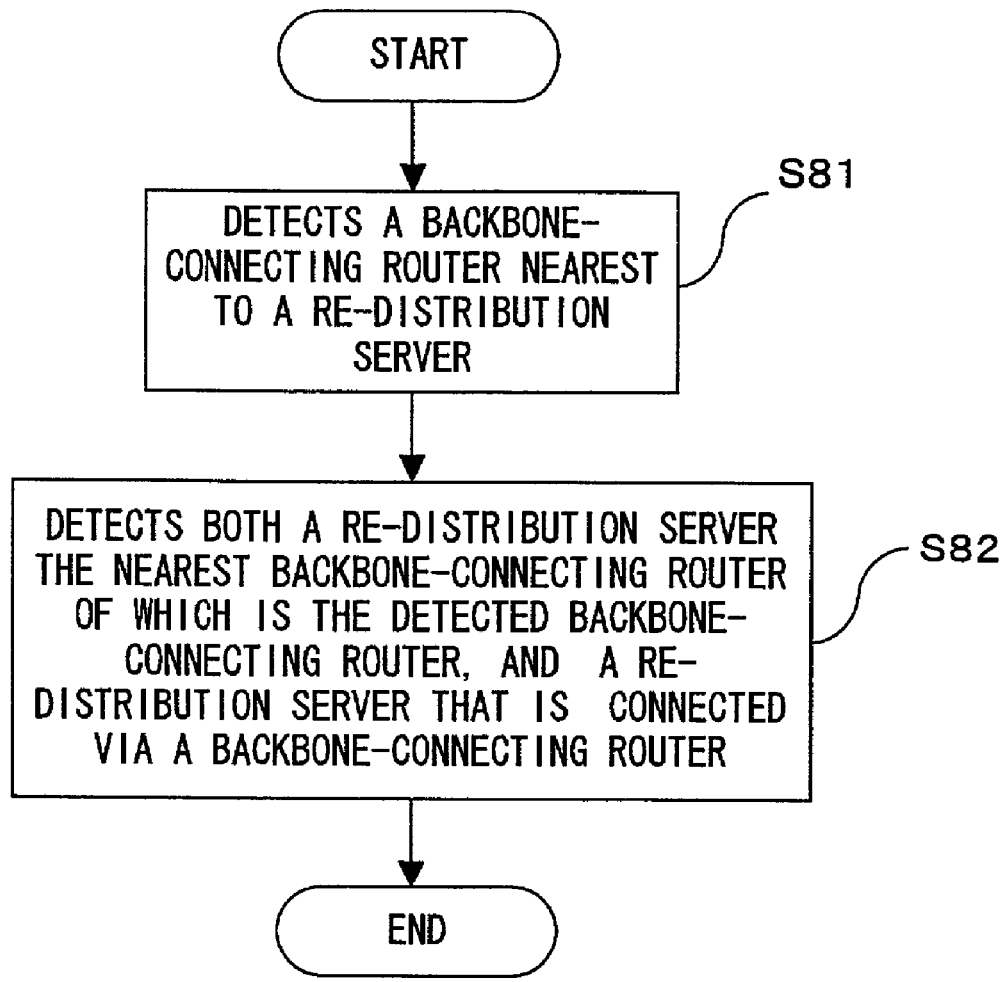
Figure 13:
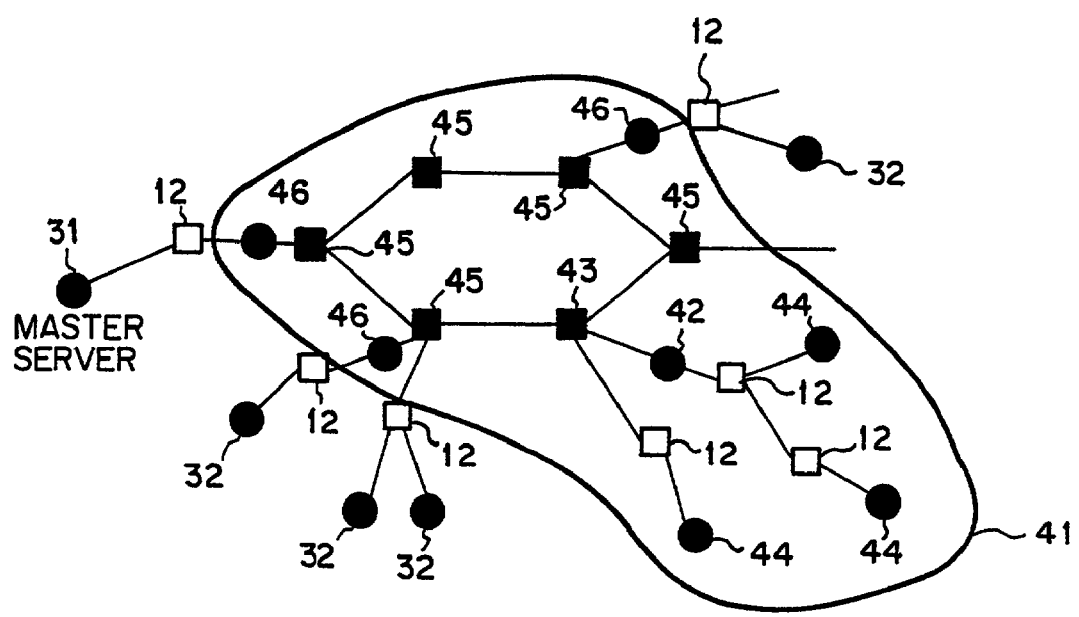
Figure 15:
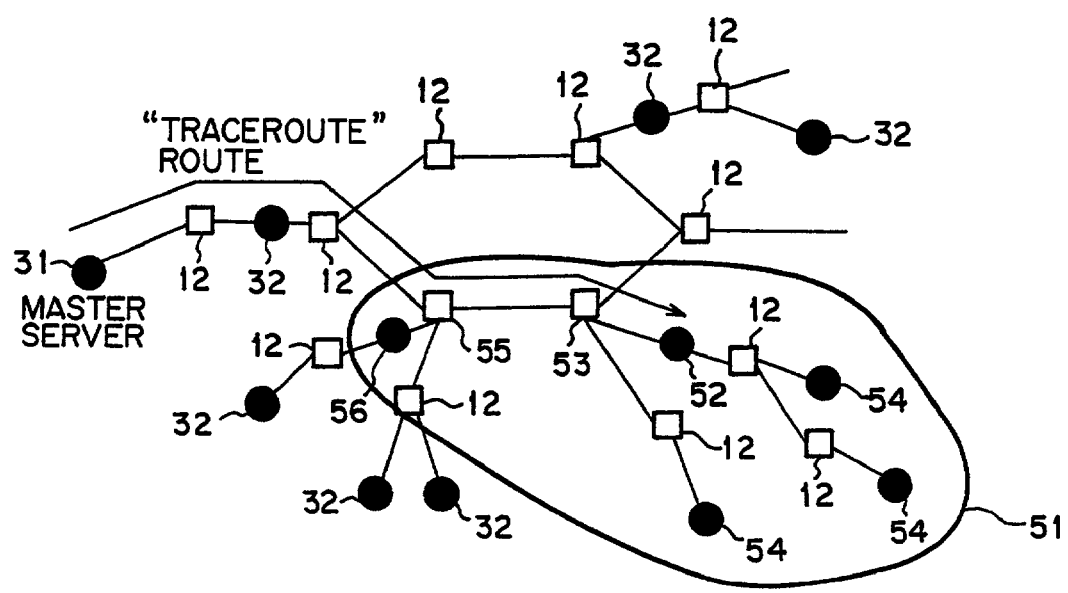
Figure 16:
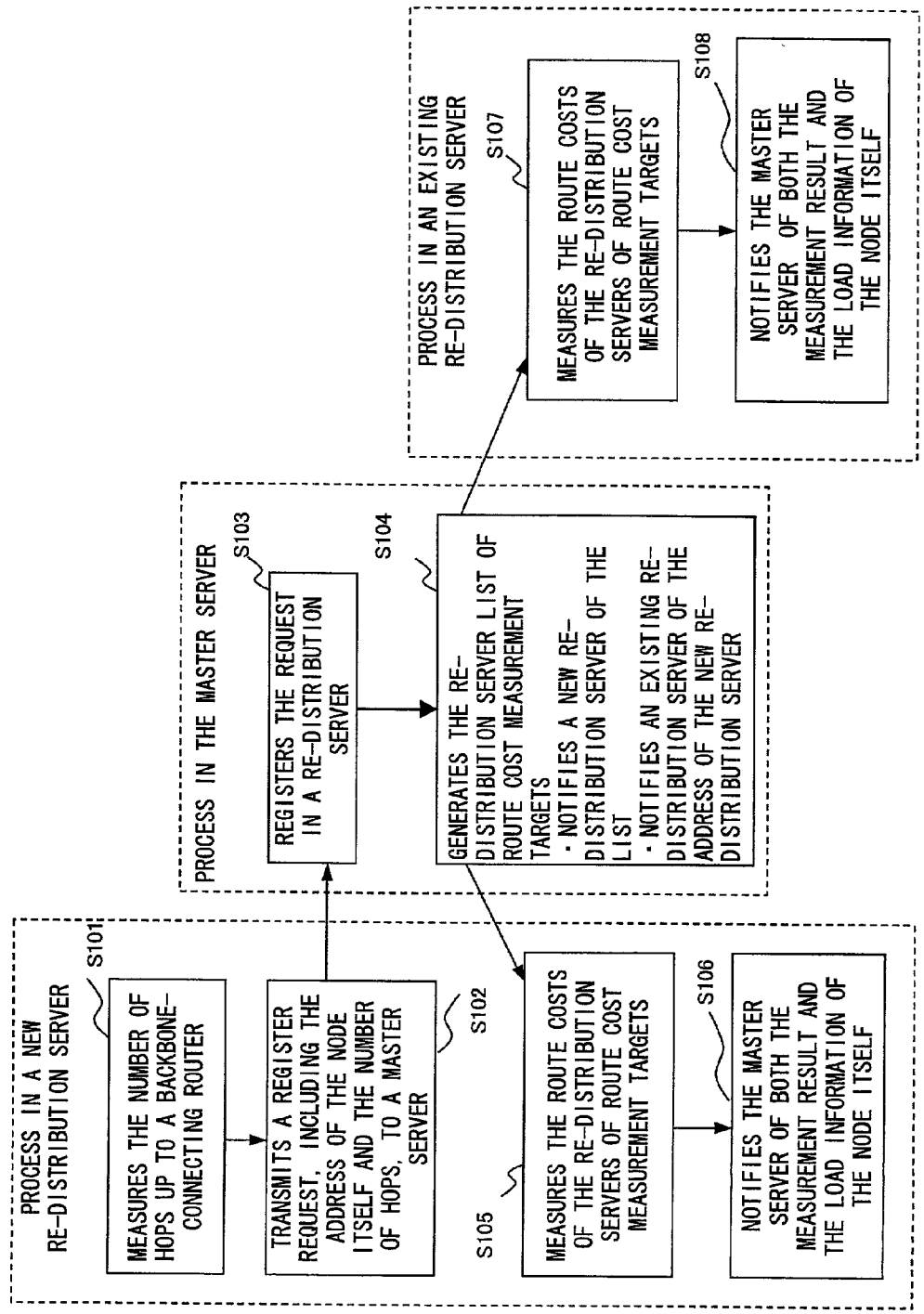
Figure 17:
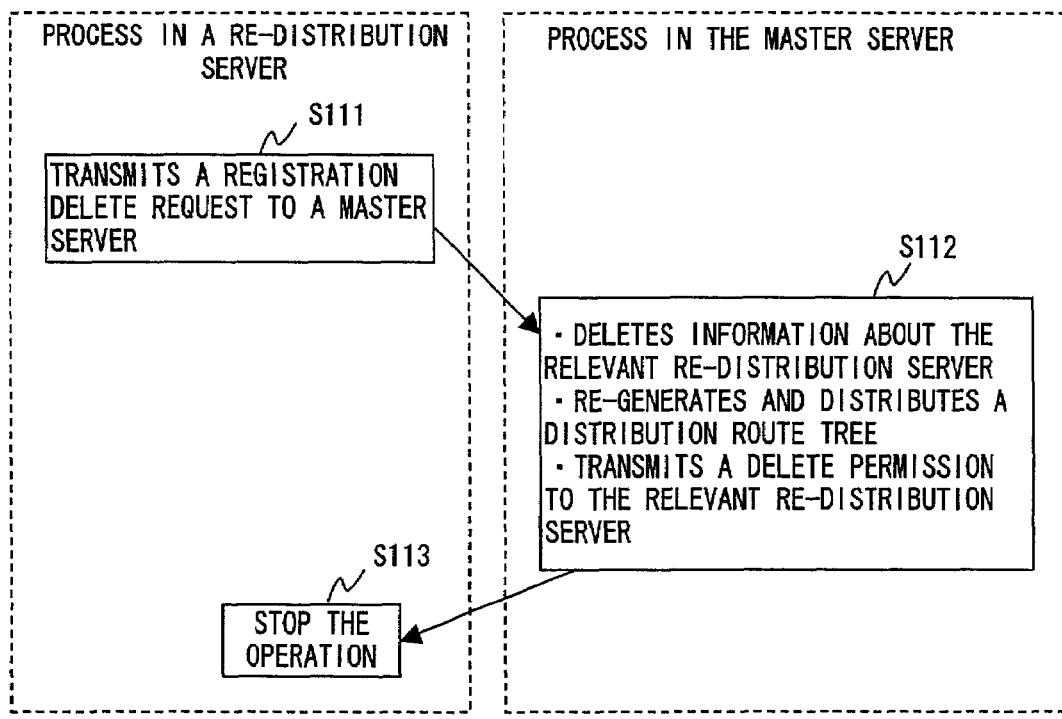
Figure 18:
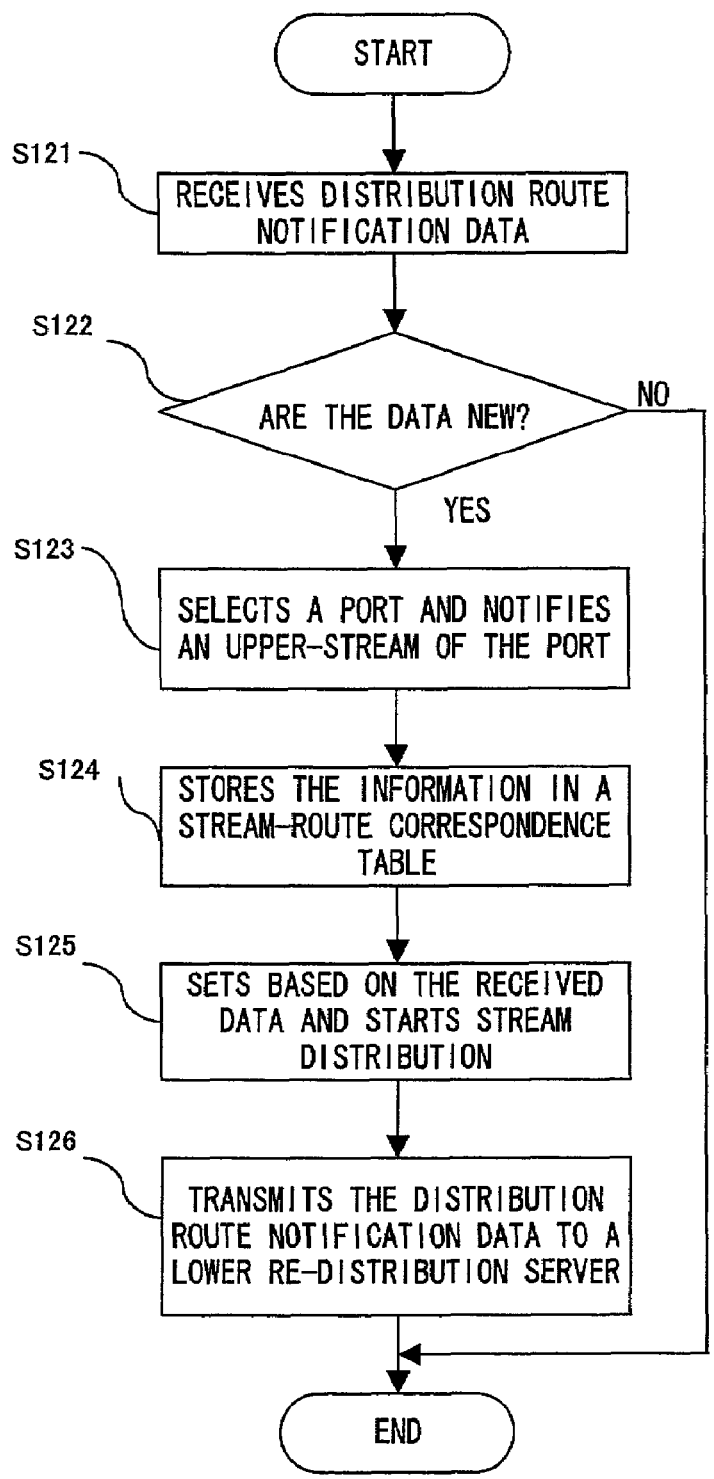
Figure 19:
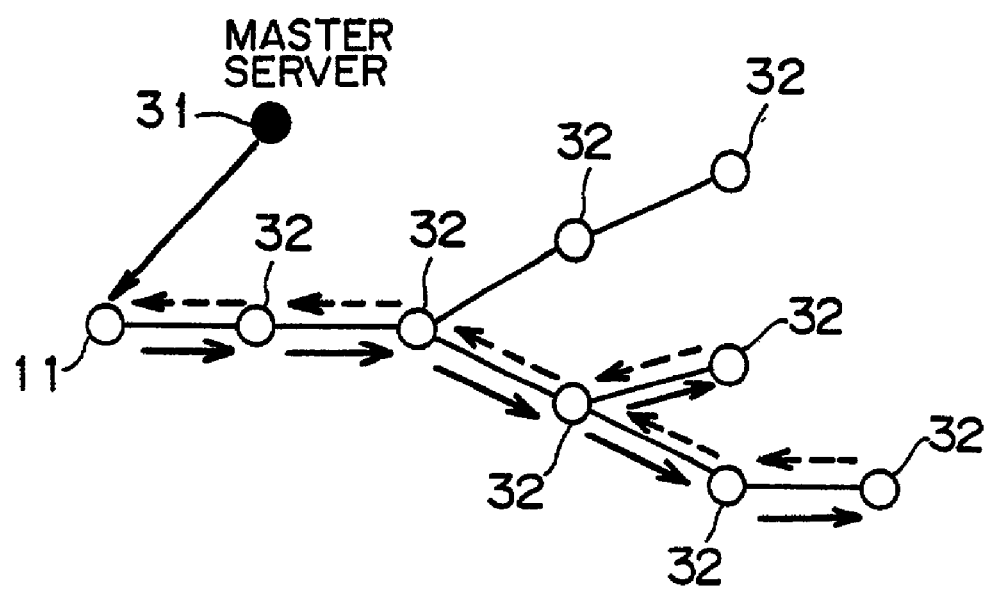
Figure 20:
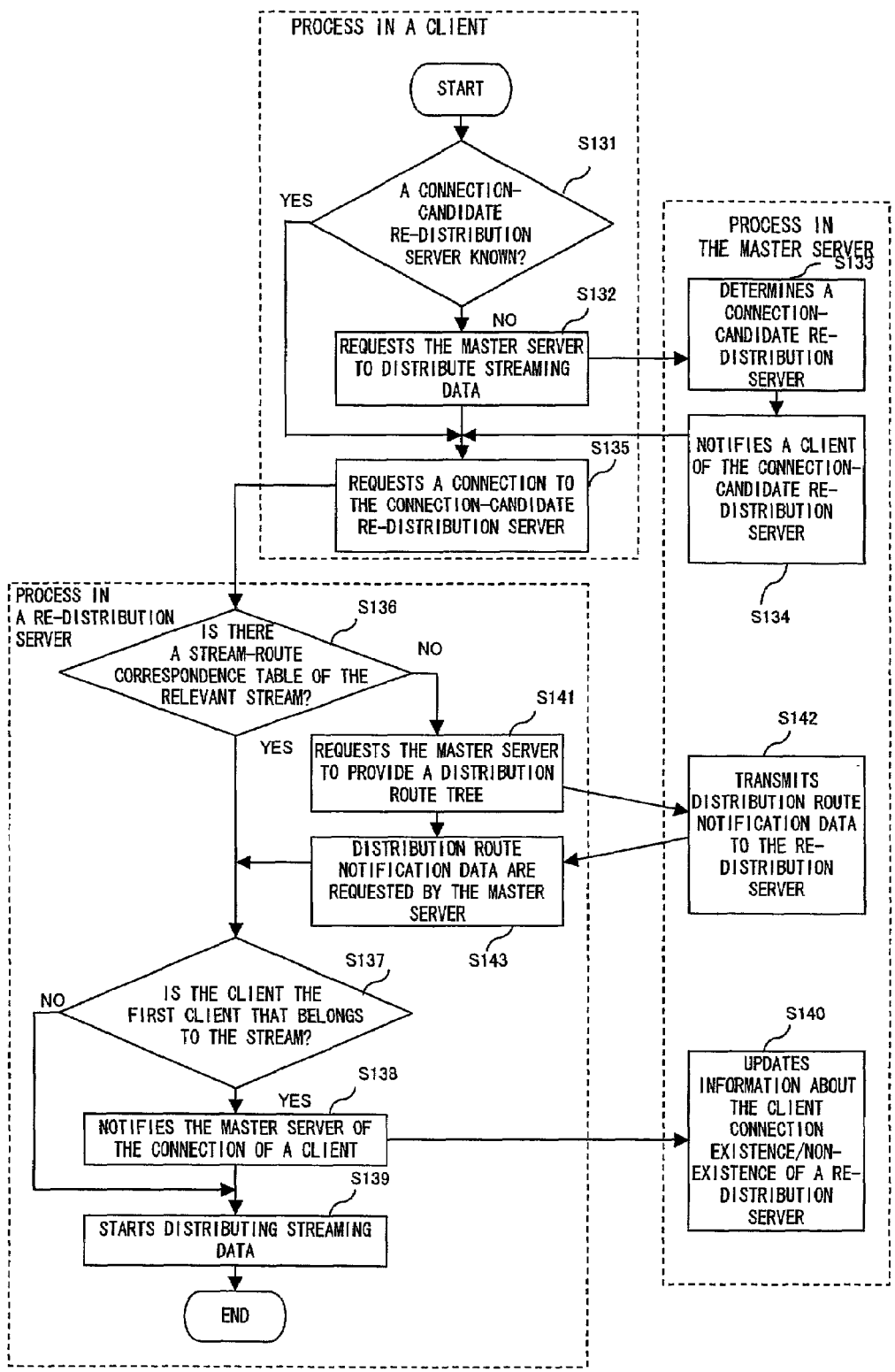
Figure 21:
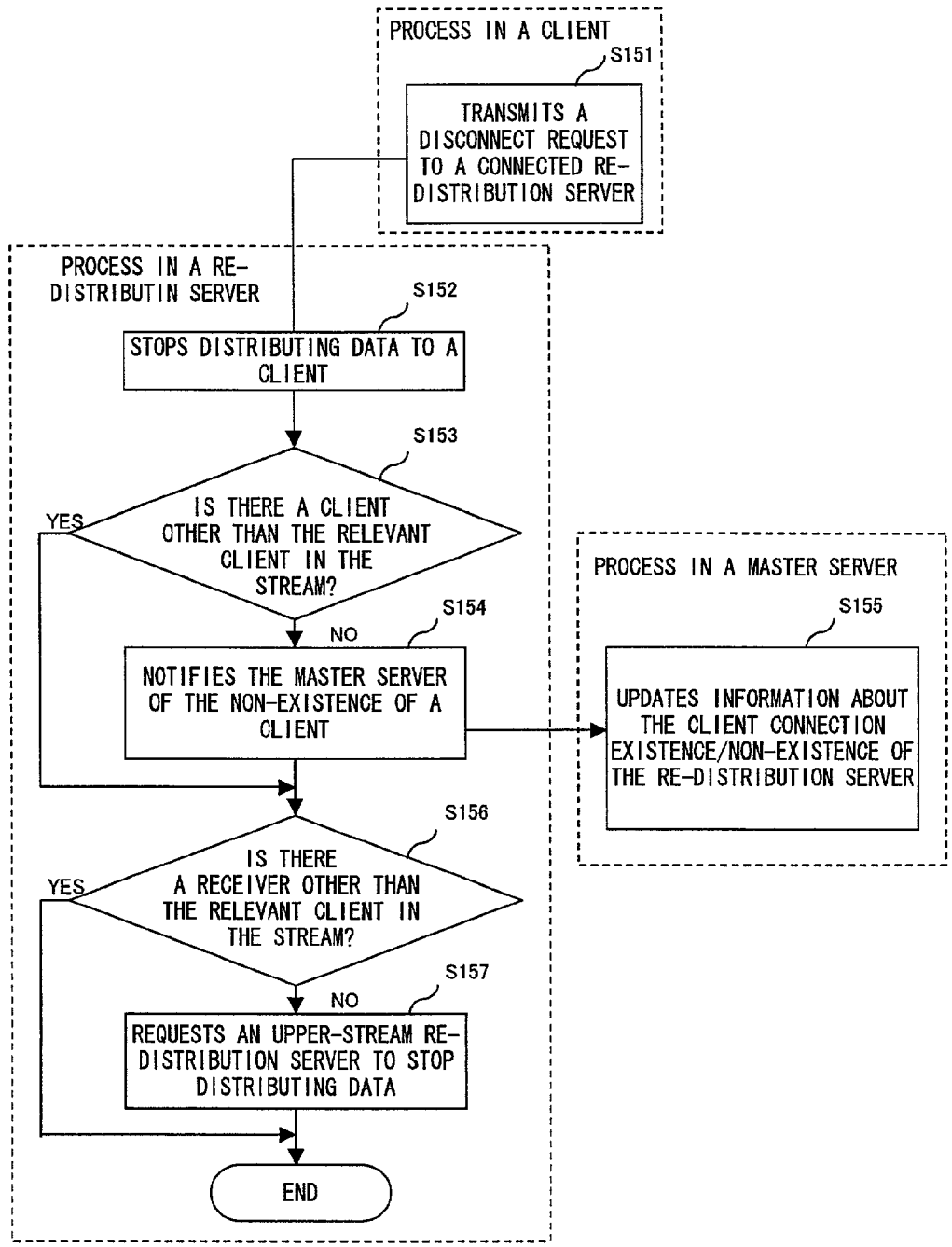
Figure 22:
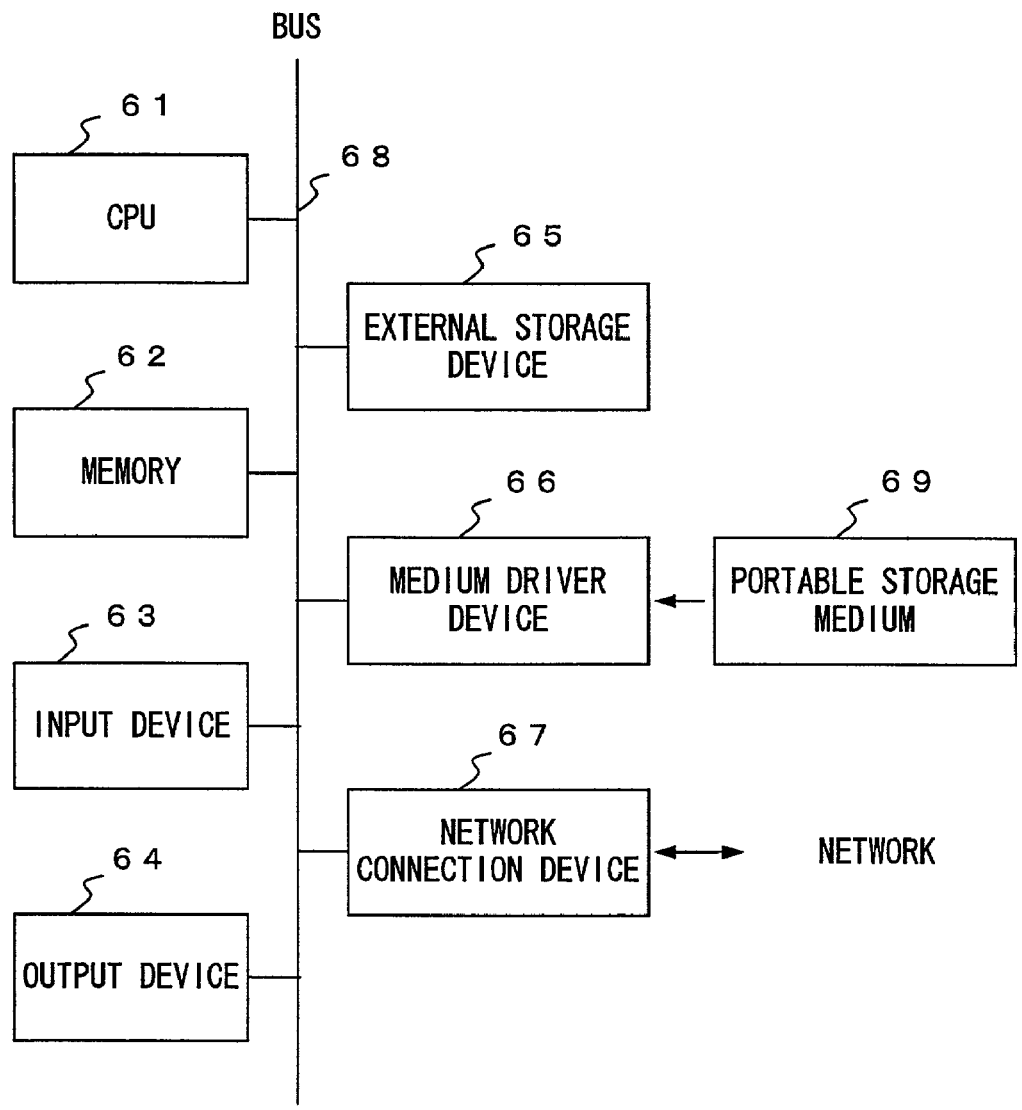
Figure 23:
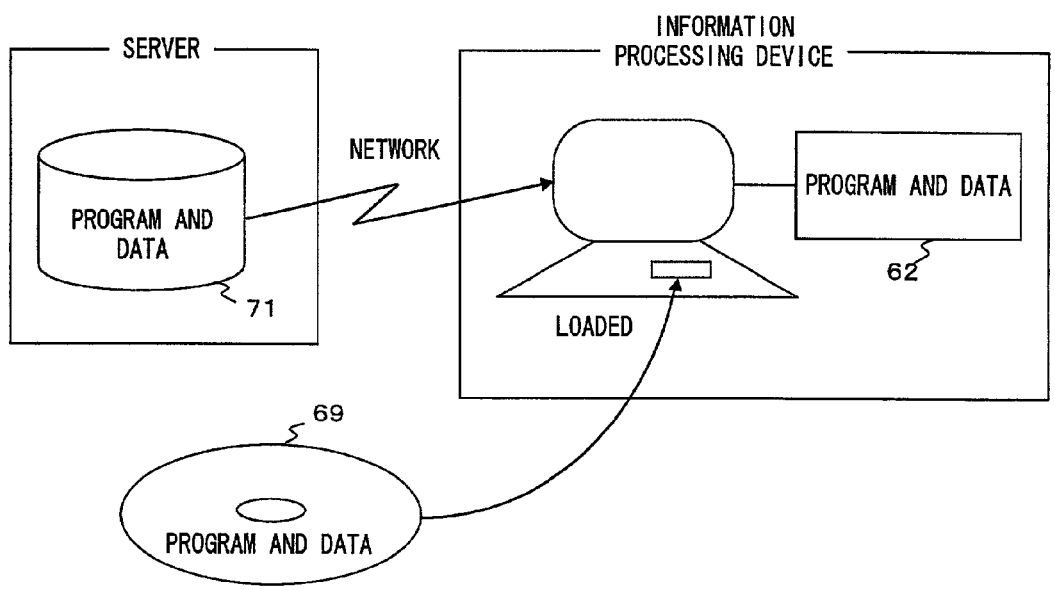

FIG. 1 shows the current situation of stream distribution.
FIG. 2A shows the basic configuration of the distribution route generation apparatus of the present invention.
FIG. 2B shows a stream distribution system.
FIG. 3 is a flowchart showing a first distribution route tree generation process.
FIG. 4 is a flowchart showing a tree generation process.
FIG. 5 is a flowchart showing a subsequent node retrieval process.
FIG. 6 shows a first distribution route.
FIG. 7 is a flowchart showing a second distribution route tree generation process.
FIG. 8 shows a second distribution route.
FIG. 9 shows the groups of re-distribution servers.
FIG. 10 is a flowchart showing a third distribution route tree generation process.
FIG. 11 is a flowchart showing a grouping process.
FIG. 12 is a flowchart showing a first measurement range determination process.
FIG. 13 shows a first measurement range.
FIG. 14 is a flowchart showing a second measurement range determination process.
FIG. 15 shows a second measurement range.
FIG. 16 is a flowchart showing a registration process.
FIG. 17 is a flowchart showing a deletion process.
FIG. 18 is a flowchart showing a distribution process.
FIG. 19 shows the distribution of notification data.
FIG. 20 is a flowchart showing a connection process.
FIG. 21 is a flowchart showing a disconnection process.
FIG. 22 shows the configuration of an information processing device.
FIG. 23 shows storage media.

DESCRIPTIONS OF THE PREFERRED EMBODIMENTS

The detailed preferred embodiments of the present invention are described below with reference to the drawings.

FIG. 2A shows the basic configuration of the distribution route generation apparatus of the present invention. The distribution route generation apparatus shown in FIG. 2A comprises a collection device 21, a generation device 22 and an output device 23. The collection device 21 collects information about communications costs between the nodes of a communications network. The generation device 22 automatically generates distribution route information indicating a distribution route from a source to a plurality of clients based on information about the communications costs when streaming data are originated from the source and are distributed to the clients. The output device 23 outputs the generated distribution route information.

The node of the communications network corresponds to a stream source, a re-distribution server and the like, and the information about communications costs between the nodes corresponds to the number of hops between the nodes, delay time and the like. The collection device 21 outputs the collected information to the generation device 22. The generation device 22 determines the distribution route of streaming data based on the received information, and outputs distribution route information to the output device 23. The output device 23 outputs the received distribution route information to a node on the distribution route and the like.

According to such a distribution route generation apparatus, distribution route information is automatically generated based on the collected information. Therefore, even if information about the physical configuration of a network cannot be obtained, a distribution route is generated. Since such a distribution route generation apparatus does not require the modification of a network layer and setting work by the manager, a distribution route can be efficiently generated.

For example, the collection device 21, generation device 22 and output device 23 that are shown in FIG. 2A correspond to the master server 31 shown in FIG. 2B, which is described later.

In this preferred embodiment, re-distribution servers are installed at the data branch points when multimedia data (streaming data), such as video data, voice data and the like, are distributed to a plurality of clients on the Internet or an Intranet. The re-distribution server corresponds to an application program or a hardware circuit with an equivalent function.

Then, the cost of each route between all pairs of two re-distribution servers is collected and a data distribution route tree is automatically generated by the following methods based on the cost information.

(a) A re-distribution server (or a re-distribution server group), which is a candidate for a next receiver, is selected in such a way that the route cost of streaming data from an originating node (source) can be minimized.

(b) A re-distribution server (or a re-distribution server group), which is a candidate for a next receiver, is selected in such a way that the route cost of streaming data from each re-distribution server (or re-distribution server group) on a distribution route can be currently generated.

In this way, the manager can efficiently and automatically generate the distribution route of streaming data without both the modification of a network layer and troublesome setting work. Therefore, the traffic congestion of a network caused by the fact that a plurality of pieces of the same streaming data flow through the same network can be avoided, and as a result, streaming data can be smoothly distributed to a plurality of clients.

If there is a branch with a high route cost, re-distribution servers are divided into a plurality of groups using the branch with a high cost as a boundary, and a distribution route tree among the groups, which has a group including a source as an origin, is generated by the method (a) described above. Further, a distribution route tree with the source as an origin is generated by the method (a) in the group including the source, and a distribution route tree with a re-distribution server, which is an input branch end of the distribution route tree among the groups, as an origin is generated by the method (a) in the other groups.

Then, the information of the generated distribution route tree is transmitted from an upper-stream re-distribution server to a lower-stream redistribution server along the route tree. In this case, distribution route tree information located in a server upper-stream from a specific re-distribution server is not required to be transmitted to a server down stream from the re-distribution server. Therefore, by deleting the information, the information of a distribution route tree can be more efficiently transmitted.

Furthermore, if route costs between re-distribution servers are collected, the workload required to measure the costs can be reduced by restricting the range of the cost measurement by the following methods.

(a) A backbone-connecting router is designated and re-distribution servers, whose nearest backbone-connecting router is the designated router, are set as the cost measurement range.

(b) A router located within the restricted number of hops h1 is detected in the upper-stream of a specific re-distribution server and re-distribution servers located within the restricted number of hops h2 from the detected router are set as the cost measurement range. By adjusting the restricted numbers of hops h1 and h2, the cost measurement range can be appropriately set.

FIG. 2B shows one stream distribution system using such re-distribution servers. The distribution system shown in FIG. 2 comprises a source 11 for transmitting streaming data, a router 12 for transferring the data, a plurality of clients 13 for receiving the data, a master server 31 for managing stream information, route cost information and the like and at least one re-distribution server 32 for copying and branching the data.

The master server 31 can be selected among re-distribution servers. Alternatively, a new server can be exclusively provided as the master server 31. The source 11 or clients 13 can also be provided with the re-distribution function of the re-distribution server 32. The re-distribution server 32 can be installed in the router or can be located between two routers 12. The re-distribution server 32 operates in an application layer and requires no modification of a network layer.

A new re-distribution server 32 requests the master server 31 to register it when the re-distribution server starts operating. After registering the re-distribution server 32, the master server 31 collects the route cost between the new re-distribution server 32 and the existing re-distribution server 32, and updates route cost information.

The source 11 registers a stream in the master server 31 prior to the transmission of streaming data. When the stream is registered, the master server 31 generates a distribution route tree using the source 11 of the stream as the origin and transmits a stream-route correspondence table to the re-distribution server 32 along the distribution route.

Each re-distribution server 32 receives streaming data from another re-distribution server 32 in the upper-stream and distributes the data to the next destination (re-distribution server 32 or client 32) according to the stream-route correspondence table.

Prior to the reception of streaming data, the client 13 is connected to a nearby re-distribution server 32 or requests the master server 31 to distribute data. The master server 31 selects a re-distribution server 32 to which the client 13 is connected, and notifies the client of the re-distribution server 32. The client 13 is connected to the re-distribution server 32 and receives the streaming data.

In this case, the network load required to collect the route costs between re-distribution servers must be small and the route cost must be effective in the generation of a distribution route tree. Both the number of hops and a bandwidth, which can be estimated from a delay time, are major factors in the determination of a route cost. From the number of hops a basic network configuration can be detected. By further taking a delay time into consideration, a route with a very narrow bandwidth can be excluded. Therefore, in this preferred embodiment, a route cost is calculated according to the following equation using both the number of hops and delay time.

Route cost=Number of hops+α*max(0, (delay-β)
*stream rate/reference rate+predetermined value The number of hops can be obtained by exchanging a test packet between nodes to be measured and detecting the change of the TTL (time to live) of a packet header. A TTL corresponds to the lifetime of a packet and is described with the remaining number of routers located up to a destination and the like. The delay time can be obtained by measuring the RTT (round trip time) of a test packet. A route cost can also be obtained by tracing the passing route of a packet using some command, like "traceroute".

The bottleneck and valid bandwidth (bandwidth that may be used) of a network and the like are measured, and based on the measurement result a route cost can also be calculated.

A stream rate is the rate (speed) of a distribution stream, and a reference rate is a stream rate that is usually anticipated. A predetermined value is an additional cost that the manager sets. This value is set in case the manager wants to restrict a stream that flows through the route and the like, and it is usually set to 0.

α and β are coefficients used to convert a delay time to the number of hops. For example, if in a link of 64 kbps, where approximately 190 ms is required for 1500 bytes to flow, a cost for 20 hops is added and in a link of 500 kbps or more, where approximately 25 ms is required for 1,500 bytes to flow, no cost is added, β=25 and α=20/(190−25)=0.12 are assigned.

The master server 31 collects route costs between re-distribution servers 32 that the master server 31 manages, as occasion arises. The collection procedure is as follows.

1. The master server 31 notifies each re-distribution server 32 of the IP address of a re-distribution server to be measured. In this case, the master server 31 can also narrow the number of re-distribution servers 32 to be measured. The narrowing method is described later.
2. Each re-distribution server detects both the number of hops between the notified re-distribution servers 32 to be measured and a delay time. In this case, a packet of a fairly large size is transmitted several times and the average of the obtained delay times is calculated. If a plurality of existing re-distribution servers 32 simultaneously measure the delay time of a new re-distribution server 32, traffic congestion may result. Therefore, packets are transmitted at intervals with some random allowance.
3. Each re-distribution server 32 notifies the master server 31 of both information about the detected number of hops and the detected delay time, and the load information of the node itself (CPU (central processing unit) load, memory capacity in use, number of distribution streams and the like).
4. The master server 31 updates the route cost information based on information posted by each re-distribution server 32.

The master server 31 basically collects route costs when a new re-distribution server 32 is registered. To cope with a change in a network situation, such as route modification, traffic congestion and the like, route costs can also be collected in the following cases.

(1) Route costs are regularly collected.
(2) Route costs are collected when a change in a network situation on the route is detected in the information of the data packet in a stream or a packet for data control.

In the case of timing (2), for example, the TTL of a data packet, such as an RTP (real-time transfer protocol) packet, the time stamp of a control packet, such as an RTCP (RTP control protocol) and the like, can be used. In this case, route costs are collected according to the following procedure.

1. A re-distribution server 32 detects a change in a network situation with an upper-stream re-distribution server in the change in the TTL of a data packet, change in the time stamp of a control packet and the like. In the change in the TTL, a route modification is detected, and in the change in the time stamp, a route modification or the occurrence of traffic congestion is detected.
2. The re-distribution server 32 requests the master server 31 to collect route costs.
3. The master server 31 starts collecting route costs according to the procedure described above.

Next, an automatic distribution route tree generation algorithm based on route cost information is described with reference to FIGS. 3 through 8. In this algorithm, it is assumed that each re-distribution server 32 is handled as a node on a network, and a route cost in the case where data are distributed from node I to node j is C[I, j]. If the cost of a route from node I to node j is not measured, C[I, j]=∞ is assumed.

FIG. 3 is a flowchart showing the distribution route tree generation process based on a cost from a source. First, the master server 31 inputs the source 11 (SRC) and other nodes to set S and set V, respectively, and i=0 is assigned (step S1). In this case, it is assumed that set V includes n nodes of node 0 through node n−1.

Then, the master server 31 initializes distance D between the source 11 and node i (i∈V) with the cost C[SRC, i] between the source 11 and node i, initializes node P[i] immediately before node i to SRC and assigns i=i+1 (step S2). Then, the master server 31 compares i with n (step S3). If i<n, the master server 31 repeats the process in step S2.

If in step S3, i≧n, the master server 31 detects a node in which D[i] is the smallest among the elements of set V and designates the node as node v (step S4). Then, the master server 31 extracts node v from set V, adds the node v to set S and assigns i=0 (step S5). Then, the master server 31 compares D[i] with D[v]+C[v, i] (step S6).

If D[i] is not smaller than D[v]+C[v, i], the master server 31 assigns both D[i]=D[v]+C[v, i] and P[i]=v (step S7), and assigns i=i+1 (step S8). Then, the master server 31 compares i with n (step S9). If i<n, the master server 31 repeats the processes in steps S6 and after. If in step S6 D[i] is smaller than D[v]+C[v, i], the master server 31 performs the processes in steps S8 and after.

If in step S9 i≧n, the master server 31 judges whether set V is empty (step S10). If set V is not empty, the master server 31 repeats the processes in steps 4 and after. If in step S10, set V becomes empty, the master server 31 generates a distribution route tree (step S11) and terminates the process.

From the viewpoint of the effective use of both a network source and the sources of each re-distribution server 32, such as a CPU, a memory and the like, it is preferable to generate a route in such a way to pass through a re-distribution server 32 if the case of passing through a re-distribution server 32 and the case of passing through no re-distribution server 32 are the same in cost.

Therefore, it is considered that the process in FIG. 3 is modified so that if there is a passable re-distribution server 32, nodes are selected so as to pass through the re-distribution server 32 whenever possible. In this case, the cost of a route via the re-distribution server is set low by subtracting a pre-determined value from the route cost.

Specifically, in step S6 the master server 31 compares D[i] with D[v]+C[v, i]−c assuming a value of 0 or more that is arbitrarily set according to the management policy and the like, to be c. If D[i] is equal to or more than D[v]+C[v, i]−c, the master server 31 performs the processes in steps S7 and after. If D[i] is smaller than D[v]+C[v, i]−c, the master server 31 performs the processes in steps S8 and after. By appropriately adjusting the value of c, the possibility that a route via node v may be selected is improved. If c=0, the process is the same as that shown in FIG. 3.

FIG. 4 is a flowchart showing the tree generation process in step S11 shown in FIG. 3. The master server 31 assigns SRC to retrieval start node p_node (step S21) and performs a subsequent node retrieval process (step S22).

FIG. 5 is a flowchart showing the subsequent node retrieval process in step S22 shown in FIG. 4. In this process, a distribution route tree is generated by tracing nodes using P[i]. First, the master server 31 assigns i=0 (step S31) and compares P[i] with p_node (step S32). If P[i] and p_node match, the master server 31 stores node i as the subsequent node of p_node and stores p_node as a node immediately before node i (step S33).

Then, the master server 31 assigns p_node=i (step S34) and recursively performs a subsequent node retrieval process (step S35). The master server 31 assigns i=i+1 (step S36) and compares i with n (step S37). If i<n, the master server 31 repeats the processes in steps S32 and after. If i≧n, the master server 31 terminates the process. The relationship among nodes that are stored in this way, corresponds to a distribution route tree.

FIG. 6 shows examples of distribution routes generated by the process shown in FIG. 3. According to this generation process, the cost of a route from the source 11 up to each re-distribution server 32 is reduced. However, as shown in FIG. 6, in this case, there is a possibility that a plurality of the same streams may flow through the same branch.

FIG. 7 is a flowchart showing a distribution route tree generation process based on a route cost from each re-distribution server on a distribution route. In FIG. 7, processes in steps S41 through S45 and S48 through S51 are the same as those in steps S1 through S5 and S8 through S11.

If in step S45 node v is added to set S, the master server 31 compares D[i] with C[v, i] (step S46). If D[i] is equal to or more than C[v, i], the master server 31 assigns both D[i]=C[v, i] and P[i]=v (step S47) and performs the processes in steps S48 and after. If in step S46, D[i] is smaller than C[v, i], the master server 31 performs the processes in steps S48 and after without any setting being required.

FIG. 8 shows examples of distribution routes generated by the process shown in FIG. 7. According to this generation process, traffic congestion caused by a plurality of the same streams flowing through the same branch can be mitigated. However, in that case, sometimes a route from the source 11 takes a detour and sometimes a route goes up the stream.

Next, an automatic distribution route tree generation algorithm by grouping is described with reference to FIGS. 9 through 11. As described above, if a distribution route tree is generated by the process shown in FIG. 3, there is a possibility that a plurality of the same streams flow through the same branch. However, if a route cost via a specific branch is high for the reason that the bandwidth of a physical link composing the branch is narrow and the like, it is preferred that only one stream flows through the branch. Therefore, the following automatic generation algorithm is applied.

First, m route cost threshold values are set as occasion arises. Then, re-distribution servers are divided into a plurality of groups connected by only branches with a route cost higher than the first threshold value, as shown in FIG. 9. In FIG. 9, a group of re-distribution servers are divided into four groups G1 through G4. Then, the re-distribution servers 32 in each obtained group are divided in the same way using the second threshold value. If such a division is made m times, a plurality of re-distribution groups are divided at m levels.

In this case, it is assumed that each finally obtained group is connected to one anther by one branch. Then, the minimum route cost of all the route costs between each re-distribution server 32 that belongs to one group and each re-distribution server 32 that belongs to another group is used as a route cost between the two groups. Re-distribution servers 32 at both ends of a route corresponding to this route cost become the input branch end candidates of each group that are determined when a distribution route tree among groups is generated.

Then, distribution route trees between groups are generated by regarding each group as one node and regarding the group to which the source 11 belongs as the origin (source). The group to which the source 11 belongs means the group that includes a re-distribution server 32 connected to the source 11.

Then, in the group to which the source 11 belongs, a distribution route tree is generated using the source 11 as the origin. In the other groups, a distribution route tree is generated using a re-distribution server 32, which is the input branch end of a distribution route tree among groups, as the origin. If the generated distribution route tree among groups and the generated distribution route tree in each group are combined, an entire distribution route tree by grouping can be obtained.

FIG. 10 is a flowchart showing such a distribution route tree generation process. First, the master server 31 divides re-distribution servers into a plurality of groups using predetermined route cost threshold values (step S61) and detects route costs between two groups (step S62). Then, the master server 31 generates a distribution route tree among groups by the process shown in FIG. 3, based on the route costs between groups (step S63). At this point, a re-distribution server 32, which becomes the input branch end of each group, is determined. Then, the master server 31 generates a distribution route tree in each group by the process shown in FIG. 3 using the source or the re-distribution server 32, which becomes the input branch end, as the origin (step S64) and terminates the process.

FIG. 11 is a flowchart showing the grouping process performed at each level in step S61 shown in FIG. 10. First, the master server 31 assigns i=0, set V=φ and set T=φ and inputs all nodes (re-distribution servers) to set V (step S71). Then, the master server 31 assigns set Si=φ, extracts an arbitrary node from set V and adds the node to set T (step S72). Then, the master server 31 extracts an arbitrary node from set T, adds the node to set Si and designates the extracted node as node j (step S73).

Then, the master server 31 compares C[j, k] with a cost threshold for each node k, which is the element of set V (step S74). If there is a node k that meets the condition of C[j, k]< cost threshold value, the master server 31 extracts the node k, adds the node to set T (step S75) and repeats the process in step S74. Then, when there becomes no node k that meets the condition, the master server 31 judges whether set T is empty (step S76).

If set T is not empty, the master server 31 repeats the processes in steps S73 and after. When set T becomes empty, the master server 31 judges whether set V is empty (step S77). If set V is not empty, the master server 31 assigns i=i+1 (step S78) and repeats the processes in steps S72 and after. When set V becomes empty, the master server 31 terminates the process.

Next, an algorithm for determining the measurement range of a route cost is described with reference to FIGS. 12 through 15. When route costs between re-distribution servers are collected, it is also important to restrict the range of cost measurement in order to mitigate the load of cost measurement. Here, both a method for restricting the measurement range by designating a backbone-connecting router and a method for restricting the measurement range based on route information by designating the nearest re-distribution server to the source, are described. A backbone-connecting router corresponds to a router connected to the backbone of a network.

According to the algorithm for determining the measurement range by designating a backbone-connecting router, when being registered in the master server 31, each re-distribution server 32 measures and stores the number of hops to all backbone-connecting routers, and simultaneously notifies the master server 31 of the information. The master server 31 manages the number of hops to the backbone-connecting routers posted by each re-distribution server 32 in a redistribution server list.

FIG. 12 is a flowchart showing such a measurement range determination process. First, the master server 31 detects a backbone-connecting router nearest to a re-distribution server 32 performing measurement based on the number of hops to a backbone-connecting router posted by the re-distribution server 32 (or the number of hops directly measured by the master server 31) (step S81).

Then, the master server 31 detects both a re-distribution server 32, the nearest backbone-connecting router of which is the detected backbone-connecting router, and a re-distribution servers 32 located on a route via a backbone-connecting router among re-distribution servers 32 other than the re-distribution server 32, the nearest backbone-connecting router of which is the detected backbone-connecting router, in the re-distribution server list, designates the detected re-distribution servers 32 as the measurement targets of the route cost (step S82) and terminates the process.

FIG. 13 shows one measurement range that is determined in this way. The measurement range shown in FIG. 13 includes re-distribution servers 44, the nearest backbone-connecting router of which is the backbone-connecting router 43 nearest to the re-distribution server 42 performing measurement, and re-distribution servers 46 on routes via the backbone-connecting routers 43 and 45 if viewed from the re-distribution server 42.

FIG. 14 is a flowchart showing the measurement range determination process based on information about a route up to a re-distribution server. In this example, it is assumed that the restricted number of hops between a router 12 immediately before a re-distribution server 32 performing measurement and another router 12 and the restricted number of hops between the former router 12 and the re-distribution server 32 are H1 and H2, respectively. The master server 31 recognizes a re-distribution server nearest to the source 11 for the reason that the source 11 and re-distribution server 32 are the same, that a distribution route tree has already been generated or the like.

First, according to an instruction from the master server 31, the re-distribution server 32 nearest to the source 11 detects both a router 12 located on a route up to the re-distribution server 32 performing measurement and the number of hops up to the re-distribution server 32 and notifies the master server 31 of the result (step S91).

Then, the master server 31 picks up a re-distribution server 32 that belong to the router 12 nearest to the re-distribution server 32 performing measurement, inputs the re-distribution server 32 to set SS1 and assigns h=1 (step S92).

Then, the master server 31 designates a router 12 located at the position h hops from the router 12 nearest to the re-distribution server 32 performing measurement on the source side, as router h (step S93). Then, the master server 31 detects a re-distribution server 32 located within H2 hops from router h (including another branch). If such a re-distribution server 32 is detected, the master server inputs the re-distribution server 32 to set SS2 (step S94).

Then, the master server 31 compares h with H1 (step S95). If h<H1, the master server 31 assigns h=h+1 (step S96) and repeats the processes in steps S93 and after. If in step S95, h equals H1, the master server 31 judges whether there is an element of set SS2 that does not belong to set SS1 (step S97). If there is no such element, the master server 31 repeats the processes in steps S96 and after.

If in step S97 there is an element of set SS2 that does not belong to set SS1, the master server 31 designates the re-distribution server 32 that belongs to both sets SS1 and SS2 as a measurement target (step S98) and terminates the process.

FIG. 15 shows one measurement range that is determined in this way. The measurement range 51 shown in FIG. 15 includes both a re-distribution server 54 that belongs to a router 53 nearest to a re-distribution server 52 performing measurement and a re-distribution server 56 nearest to a router 55 located one hop from the router 53.

Next, the detailed process of the distribution system shown in FIG. 2B is described with reference to FIGS. 16 through 21.

When a new re-distribution server starts operating, the re-distribution server is registered in a master server and the route cost between the new re-distribution server and existing re-distribution server is collected. If a re-distribution server stops operating, the registration information is deleted and the route cost between re-distributions is updated.

FIG. 16 is a flowchart showing the registration process of a new re-distribution server. First, a new re-distribution server measures the number of hops up to a backbone-connecting router (step S101) and transmits a register request, including both the IP address of the node itself and the measured number of hops up to a master server (step S102). Here it is assumed that the address of a master server is made public on a Web and the like, or is described in a re-distribution server program when the program is downloaded.

Then, the master server registers both the IP address of the new re-distribution server and the number of hops up to a backbone-connecting router in a re-distribution server list (step S103). Then, the master server generates a re-distribution server list, including the IP address list of re-distribution servers that are the measurement targets of route costs, by the measurement range determination process described above (step S104). In this case, the master server notifies the new re-distribution server and the existing re-distribution servers included in the re-distribution server list of the re-distribution server list and the IP address of the new re-distribution server, respectively, as the measurement targets of a route cost.

The new re-distribution server measures route costs targeting each re-distribution server included in the redistribution server list posted by the master server (step S105) and notifies the master server of both the measurement result and the load information of the node itself (step S106).

The existing re-distribution server measures a route cost targeting the new re-distribution server posted by the master server (step S107) and notifies the master server of both the measurement result and the load information of the node itself (step S108).

FIG. 17 is a flowchart showing the deletion process of a re-distribution server. First, when wanting to stop operating, a re-distribution server transmits a registration delete request to the master server (step S111). Then, the master server deletes information about the re-distribution server, re-generates a new distribution route tree and distributes the information of the new distribution route tree (step S112). The master server also transmits deletion permission to the re-distribution server that has requested the deletion. On receipt of the deletion permission, the re-distribution server stops operating.

A distribution route tree is the route tree of re-distribution servers to be used when specific streaming data are distributed. Therefore, the process described above based on the route cost information between re-distribution servers generates a distribution route tree. The distribution route tree of a stream is generated when the stream is registered, and it is updated when a re-distribution server is registered or deleted. A generated distribution route tree and a route through which an actual stream is distributed are generally different, and actual streaming data are sometimes distributed to the branches of a distribution route tree to which no client is connected in the lower stream.

A source registers the following stream information in a master server prior to the distribution of streaming data.
(1) Transmitting source: IP address of a host (source) that transmits data
(2) Stream ID: Unique identification information for each transmitting host
(3) Distribution form: Client-request type/distribution type
(4) Distribution range: Range within which data are distributed in the case of distribution type If the distribution form is of client-request type, data are distributed to the branches of a distribution route tree to which a client is connected. In the case of distribution type, data are distributed to a re-distribution server within a set range, regardless of whether a client is connected to the re-distribution server. The distribution range is designated by domain, and real data are not transferred to a branch, the end of which is not a designated domain.

Basically the master server generates a distribution route tree the root of which is a stream source, when stream information is registered. At this moment, the master server exercises admission control while referring to the load information of each re-distribution server, and does not use a re-distribution server that has already distributed a lot of streams. A distribution route tree can also be regenerated when a re-distribution server is registered/deleted or when a change in a network situation is detected.

If there is information about a route or re-distribution server in which a failure may occur (load tends to increase and the like), a re-distribution server on such a route can also be designated and a substitute distribution route tree in which the designated re-distribution server is not routed can also be generated in advance as a standby distribution route tree.

A standby distribution route tree can be generated by designating the remaining servers obtained by removing the designated re-distribution servers from re-distribution servers managed by the master server as available re-distribution servers and applying an automatic generation algorithm to them. If there are a plurality of possibilities that a failure may occur, a standby distribution route tree obtained by removing a corresponding part is generated for each possibility. A switch from the running distribution route tree to a standby distribution route tree is made, for example, when a change in a network situation is detected.

The master server notifies each re-distribution server of stream information about the distribution route tree along the distribution route tree. The timing of notification varies depending on the distribution form of a stream. In the case of a client-request type, it is when a distribution route tree request is received from a re-distribution server to which a client is connected. In the case of a distribution type, it is immediately after a distribution route tree is generated. At that moment, the master server distributes the following distribution route notification data to each re-distribution server.

A stream source (IP address), a stream ID, an upper-stream server address, a port, a route number, a passing re-distribution server address, the number of branches, a branch (lower-stream) route number, . . . , a route number, a passing re-distribution server address, the number of branches, a branch (lower-stream) route number, . . . , a route number, a passing re-distribution server address, the number of branches (0).

In the case of a client-request type stream, the master server extracts a distribution route up to a re-distribution server that has transmitted a distribution route tree request of the entire distribution route tree and distributes the distribution route as distribution route notification data. In the case of a distribution type stream, the master server distributes the data of the entire route. On receipt of the distribution route notification data, each re-distribution server manages both the stream and information of the distribution route tree as a stream-route correspondence table.

In this case, an upper-stream redistribution server deletes information that does not need to be transmitted to a lower-stream server (information about a distribution route on the upper-stream side) from the distribution route notification data and distributes the remaining data to lower-stream re-distribution servers.

FIG. 18 is a flowchart showing a process in which each re-distribution server distributes the posted information to another re-distribution server. First, a re-distribution server receives distribution route notification data from an upper-stream re-distribution server (step S121) and judges whether the received data is new (step S122).

If the received data are new, the re-distribution server secures ports for stream reception and notifies the upper-stream re-distribution server of the identification information (step S123). In this case, the re-distribution server, for example, selects an unused port of the lowest number of the secured ports and notifies the upper-stream server of the following data, including the number.

A stream source (IP address), a stream ID, the IP address of the node itself, a receiving port number On receipt of the data, the upper-stream re-distribution server stores the information in a stream-route correspondence table.

Then, the re-distribution server that has posted the port number stores the following information in the stream-route correspondence table (step S124). However, the re-distribution server that has posted the port number stores the receiving port number of a lower-stream re-distribution server when notification is received from the re-distribution server.
(1) Stream source (IP address)
(2) Stream ID
(3) Both the address and route number of an upper-stream re-distribution server
(4) The address, port number and route number of a lower-stream re-distribution Then, each re-distribution makes a setting based on the received distribution route notification data and starts stream distribution (step S125). Then, the re-distribution server deletes information about the node itself from the distribution route notification data, transmits the remaining distribution route notification data to a lower re-distribution server (step S126) and terminates the process. If in step S122 the received data is the same as that already received, the re-distribution server performs the process in step S126 without storing the information.

FIG. 19 shows both the distribution of distribution route notification data and the notification of a port number of such a process. In FIG. 19, solid and broken arrows indicate the distribution of distribution route notification data and the notification of a port number, respectively. Distribution route notification data are transmitted from the master server 31 to the source 11 and are distributed to lower-stream re-distribution servers along a distribution route tree.

In the case of a client-request type, when there is no re-distribution server or client to which data should be distributed in the lower-stream, each distribution server transmits the following data to an upper-stream server and requests the stoppage of the data distribution.

a stream source (IP address), a stream ID, a release flag, the IP address of the node itself, a receiving port number.

Next, the connection/disconnection of a client is described. FIG. 20 is a flowchart showing a client connection process. First, a client judges whether the client has information about a re-distribution server to be a connection candidate (step S131). If the client does not have the information, the client requests a master server to distribute a stream (step S132). It is assumed that information about both a master server and a stream can be obtained from the Web and the like.

The master server determines a re-distribution server to be a connection candidate as occasion arises (step S133) and notifies the client of the determined re-distribution server (step S134). In this case, the master server obtains the domain of the client using a DNS (domain name system). If there is a re-distribution server in the same domain, the master server designates the re-distribution server as a connection candidate.

Then, as in the case of the narrowing of a route cost measurement range described above, the master server detects the position of the client and selects a re-distribution server located near the distribution route tree of the stream. A re-distribution server that has already distributed a lot of streams is excluded by admission control.

When being notified of a connection-candidate re-distribution server, the client requests the re-distribution server to connect it (step S135). In this case, the client notifies the re-distribution server of both the stream information and the receiving port number of the client.

On receipt of the connect request, the re-distribution server first judges whether the re-distribution server has the stream-route correspondence table of the relevant stream (step S136). If the re-distribution server has the correspondence table, the re-distribution server judges whether the client that has requested the connection is the first client of the stream (step S137).

If it is the first client, the re-distribution server notifies the master server of the connection of the client (step S138) and starts distributing streaming data to the client (step S139). The master server updates information about the existence/non-existence of a client connection of the stream of the redistribution server (step S140). If in step S137 the client that has requested the connection is not the first client, the re-distribution server performs the process in step S139 without performing another process.

If in step S136 there is no stream-route correspondence table of the relevant stream, the re-distribution server transmits the following data to the master server and requests a distribution route tree (step S141). the address of a re-distribution server, the address of a stream source, a stream ID.

The master server transmits distribution route notification data as occasion arises (step S142). The re-distribution server receives the data via an upper-stream re-distribution server and makes settings of streaming data distribution based on the receiving data (step S143) and performs the processes in steps S137 and after.

FIG. 21 is a flowchart showing a client disconnection process. First, a client transmits a disconnect request to a re-distribution server to which the client is connected (step S151).

The re-distribution server stops distributing data to the client in response to the request, and deletes the item of the client from the stream-route correspondence table (step S152). Then, the re-distribution server judges whether there is a client other than the client in the stream (step S153).

If there is not another client, the re-distribution server notifies the master server of the existence of no client (step S154). The master server updates information about the existence/non-existence of a client connection of the stream of the re-distribution server (step S155).

Then, the re-distribution server judges whether there is a receiver other than the client of the stream (step S156). If there is not another receiver, the re-distribution server requests an upper-stream re-distribution server to stop distributing data (step S157).

If in step S153 there is another client, the re-distribution server performs the processes in steps in S156 and after. If in step S156 there is no receiver, the re-distribution server terminates the process without a further process.

The source 11, client 13, master server 31 and re-distribution server 32 shown in FIG. 2B are operated, for example, by the information processing device (computer) shown in FIG. 22. The information processing device shown in FIG. 22 comprises a CPU (central processing unit) 61, a memory 62, an input device 63, an output device 64, an external storage device 65, a medium driver device 66 and a network connection device 67, and they are connected to one another by a bus 68.

The memory 62 includes, for example, a ROM (read-only memory), a RAM (random access memory) and the like, and it stores both a program and data to be used for the process. The CPU 61 performs necessary processes by using the memory 62 and executing the program.

The input device 63 includes, for example, a keyboard, a pointing device, a touch panel and the like, and is used by an operator to input both instructions and information. The output device 64 includes, for example, a display, a printer, a speaker and the like, and is used to output inquiries and process results to an operator.

The external storage device 65 includes, for example, a magnetic disk device, an optical disk device, a magneto-optical disk device, a tape device and the like. The information processing device stores the program and data described above in this external storage device 65 in advance, and uses the program and data by loading them into the memory 62 as occasion arises.

The medium driver device 66 drives a portable storage medium 69 and accesses the recorded content. For the portable storage medium, an arbitrary computer-readable storage medium, such as a memory card, a floppy disk, a CD-ROM (compact-disk read-only memory), an optical disk, a magneto-optical disk and the like, is used. An operator stores the program and data described above in this portable storage medium in advance, and uses the program and data by loading them into the memory 62 as occasion arises.

The network connection device 67 is connected to an arbitrary communications network, such as the Internet, an Intranet and the like, and transmits/receives data accompanying the communications. The information processing device receives the program and data described above from another device, such as a server and the like, and uses the program and data by loading them into the memory 62 as occasion arises.

FIG. 23 shows computer-readable storage media for providing the information processing device shown in FIG. 22 with both a program and data. The program and data stored in the portable storage medium 69 or the database 71 of a server 70 are loaded into the memory 62. In this case, the server 70 generates a propagation signal for propagating the program and data, and transmits it to the information processing device via an arbitrary transmission medium on a network. Then, the CPU 61 performs necessary processes by using the data and executing the program.

According to the present invention, there is no need for both the modification of a network layer and troublesome setting work to be performed by the manager, and the distribution routes of streaming data in an application layer can be efficiently and automatically established. Therefore, the traffic congestion of a network caused by the fact that a plurality of the same streaming data flow through the same network, can be avoided and streaming data can be smoothly distributed to a client.

What is claimed is:

1. A distribution route generation apparatus, comprising:
  a collection device collecting information about a communications cost between a plurality of nodes of a communications network the nodes including a plurality of redistribution servers which copy and branch streaming data at respective branch points in the communication network to multi-cast the streaming data in an application layer where route cost is based on delay and number of hops, stream rate, reference rate, predetermined value as an additional cost and coefficients used to convert delay to number of hops where route cost=number of hops+$\alpha$*max(0, (delay-$\beta$))*stream rate/reference rate+predetermined value;
  a generation device automatically generating distribution route information, which indicates a plurality of distribution routes to a plurality of clients on the communications network forced to pass through at least one of the redistribution servers from a source, based on the information about the communications cost when the streaming data are originated and distributed from the source to the plurality of clients; and
  an output device outputting the distribution route information.

2. The distribution route generation apparatus according to claim 1, wherein said generation device generates the distribution route information by selecting a receiver node in such a way that a communications cost between the source and the receiver node is minimized.

3. The distribution route generation apparatus according to claim 1, wherein said generation device generates the distribution route information by selecting a receiver node in such a way that a communications cost between each node on a distribution route being generated and the receiver node is minimized.

4. The distribution route generation apparatus according to claim 1, wherein said generation device divides the nodes into a plurality of groups, generates inter-group distribution route information using a group to which the source belongs as an origin, generates intra-group distribution route information in the group to which the source belongs using the source as an origin, and generates intra-group distribution route information in the other groups using a node that is an input branch end of an inter-group distribution route, as an origin.

5. The distribution route generation apparatus according to claim 4, wherein said generation device divides the nodes into the groups using a branch in which a communications cost between nodes is equal to or more than a threshold value, as a boundary.

6. The distribution route generation apparatus according to claim 1, further comprising
  a restriction device restricting a measurement range of the communications cost.

7. The distribution route generation apparatus according to claim 6, wherein said restriction device designates a router that is connected to a backbone of the communications network and designates at least one node that is connected to the backbone via the designated router as a measurement target.

8. The distribution route generation apparatus according to claim 6, wherein said restriction device detects a router located within a first restricted number of hops from a measuring node performing measurement, based on information about a route from the source to the measuring node and designates a node located within a second restricted number of hops from the detected router as a measurement target.

9. The distribution route generation apparatus according to claim 1, further comprising
  a detection device detecting change in a network situation based on information of at least one of a data packet and a control packet,
  wherein said collection device collects the information about the communications cost when the network situation changes.

10. The distribution route generation apparatus according to claim 1, further comprising
  a detection device detecting change in a network situation based on information of at least one of a data packet and a control packet,
  wherein said generation device re-generates distribution route information when the network situation changes.

11. The distribution route generation apparatus according to claim 1, wherein said generation device further generates distribution route information indicating a substitute distribution route, excluding a part in which a failure is anticipated to occur on the communications network.

12. The distribution route generation apparatus according to claim 11, further comprising
  a detection device detecting change in a network situation based on information of at least one of a data packet and a control packet,
  wherein said generation device switches a current distribution route to the substitute distribution route when the network situation changes.

13. A computer-readable storage medium that records a computer program for enabling a computer to perform a process, said process comprising:

collecting information about a communications cost between a plurality of nodes of a communications network the nodes including a plurality of redistribution servers which copy and branch streaming data at respective branch points in the communication network to multi-cast the streaming data in an application layer where route cost is based on delay and number of hops, stream rate, reference rate, predetermined value as an additional cost and coefficients used to convert delay to number of hops where route cost=number of hops+ α*max(0, delay-β)) *stream rate/reference rate+predetermined value; and automatically generating distribution route information, which indicates a plurality of distribution routes to a plurality of clients on the communications network forced to pass through at least one of the redistribution servers from a source, based on the information about the communications cost when the streaming data are originated and distributed from the source to the plurality of clients.

14. A distribution route generation method, comprising:

collecting information about a communications cost between a plurality of nodes of a communications network the nodes including a plurality of redistribution servers which copy and branch streaming data at respective branch points in the communication network to multi-cast the streaming data in an application layer where route cost is based on delay and number of hops, stream rate, reference rate, predetermined value as an additional cost and coefficients used to convert delay to number of hops where route cost=number of hops+ α*max(0, delay-β)) *stream rate/reference rate+predetermined value; and automatically generating distribution route information, which indicates a plurality of distribution routes to a plurality of clients on the communications network forced to pass through at least one of the redistribution servers from a source, based on the information about the communications cost when the streaming data are originated and distributed from the source to the plurality of clients.

15. The distribution route generation method according to claim 14, wherein said distribution route information is distributed from an upper-stream node to a lower-stream node along the distribution routes.

16. The distribution route generation method according to claim 15, wherein information that need not be transmitted to the lower node is deleted from the distribution route information in the upper-stream node and remaining information is distributed from the upper-stream node to the lower-stream node.

17. The distribution route generation method according to claim 15, wherein a port is secured to receive the streaming data in the lower-stream node and identification information of the port is notified from the lower-stream node to the upper-stream node.

18. A distribution route generation apparatus, comprising:

collection means for collecting information about a communications cost between a plurality of nodes of a communications network the nodes including a plurality of redistribution servers which copy and branch streaming data at respective branch points in the communication network to multi-cast the streaming data in an application layer where route cost is based on delay and number of hops, stream rate, reference rate, predetermined value as an additional cost and coefficients used to convert delay to number of hops where route cost=number of hops+α*max(0, delay-β))*stream rate/reference rate+ predetermined value;

generation means for automatically generating distribution route information, which indicates a plurality of distribution routes to a plurality of clients on the communications network forced to pass through at least one of the redistribution servers from a source, based on the information about the communications cost when the streaming data are originated and distributed from the source to the plurality of clients; and output means for outputting the distribution route information.

* * * * *

UNITED STATES PATENT AND TRADEMARK OFFICE
CERTIFICATE OF CORRECTION

PATENT NO. : 7,583,796 B2  Page 1 of 1
APPLICATION NO. : 09/879098
DATED : September 1, 2009
INVENTOR(S) : Tomikawa et al.

It is certified that error appears in the above-identified patent and that said Letters Patent is hereby corrected as shown below:

Column 17, Line 11, change "$\alpha*\max(0, \text{delay}-\beta))$" to --$\alpha*\max(0, (\text{delay}-\beta))$--.

Column 17, Line 32, "$\alpha*\max(0, \text{delay}-\beta))$" to --$\alpha*\max(0, (\text{delay}-\beta))$--.

Column 18, Line 27, "$\alpha*\max(0, \text{delay}-\beta))$" to --$\alpha*\max(0, (\text{delay}-\beta))$--.

Signed and Sealed this

Twenty-ninth Day of December, 2009

David J. Kappos
*Director of the United States Patent and Trademark Office*